US012772089B2

(12) United States Patent
Hu et al.

(10) Patent No.: US 12,772,089 B2
(45) Date of Patent: Oct. 20, 2026

(54) METHODS FOR PROCESSING RADIO RESOURCE MANAGEMENT MEASUREMENT AND NETWORK SIDE DEVICE

(71) Applicant: GUANGDONG OPPO MOBILE TELECOMMUNICATIONS CORP., LTD., Dongguan (CN)

(72) Inventors: Yi Hu, Dongguan (CN); Qianxi Lu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 300 days.

(21) Appl. No.: 18/410,544

(22) Filed: Jan. 11, 2024

(65) Prior Publication Data

US 2024/0147283 A1 May 2, 2024

Related U.S. Application Data

(63) Continuation of application No. PCT/CN2021/107192, filed on Jul. 19, 2021.

(51) Int. Cl.
*H04W 24/10* (2009.01)
*H04W 52/34* (2009.01)
(Continued)

(52) U.S. Cl.
CPC ......... *H04W 24/10* (2013.01); *H04W 52/367* (2013.01); *H04W 88/04* (2013.01); *H04W 92/18* (2013.01)

(58) Field of Classification Search
None
See application file for complete search history.

(56) References Cited

U.S. PATENT DOCUMENTS

2017/0163470 A1 6/2017 Seo
2018/0014238 A1 1/2018 Lee et al.
(Continued)

FOREIGN PATENT DOCUMENTS

CN 106471840 A 3/2017
CN 108347737 A 7/2018
(Continued)

OTHER PUBLICATIONS

International Search Report in the international application No. PCT/CN2021/107192, mailed on Apr. 20, 2022. 5 pages with English translation.

(Continued)

*Primary Examiner* — Scott M Sciacca
(74) *Attorney, Agent, or Firm* — BAYES PLLC

(57) ABSTRACT

Methods for processing a radio resource management (RRM) measurement and a network side device are provided. The method includes: acquiring a first RRM measurement criterion corresponding to a first relay sidelink terminal, the first relay sidelink terminal being a relay sidelink terminal serving the non-relay sidelink terminal; and in response to measuring that channel quality associated with the first relay sidelink terminal meets the first RRM measurement criterion, performing a first RRM measurement processing on a second relay sidelink terminal, other than the first relay sidelink terminal, in relay sidelink terminals, the second relay sidelink terminal having a serving range covering the non-relay sidelink terminal.

14 Claims, 7 Drawing Sheets

(51) Int. Cl.

| | |
|---|---|
| ***H04W 52/36*** | (2009.01) |
| ***H04W 88/04*** | (2009.01) |
| ***H04W 92/18*** | (2009.01) |

(56) References Cited

U.S. PATENT DOCUMENTS

| | | | | |
|---|---|---|---|---|
| 2018/0063768 | A1* | 3/2018 | Martin | H04W 36/302 |
| 2018/0109990 | A1* | 4/2018 | Martin | H04W 8/005 |
| 2018/0255505 | A1 | 9/2018 | Thyagarajan et al. | |
| 2020/0068510 | A1* | 2/2020 | Martin | H04W 52/146 |
| 2021/0045093 | A1 | 2/2021 | Rao | |
| 2021/0105649 | A1 | 4/2021 | Lee | |
| 2021/0105863 | A1 | 4/2021 | Martin | |
| 2022/0312243 | A1* | 9/2022 | He | H04W 24/08 |
| 2023/0362881 | A1* | 11/2023 | Wu | H04W 40/22 |
| 2023/0422141 | A1* | 12/2023 | Chang | H04B 17/328 |
| 2024/0007922 | A1* | 1/2024 | Cheng | H04W 40/12 |

FOREIGN PATENT DOCUMENTS

| | | | |
|---|---|---|---|
| CN | 110463342 | A | 11/2019 |
| WO | 2021027755 | A1 | 2/2021 |

OTHER PUBLICATIONS

Written Opinion of the International Search Authority in the international application No. PCT/CN2021/107192, mailed on Apr. 20, 2022. 6 pages with English translation.

3GPP TSG-RAN WG2 Meeting #114 electronic R2-2106472, Online, May 19-27, 2021, Agenda item: 10.2, Source: Vice Chairman (ZTE Corporation), Title: Report from Break-out session on R17 NTN and REDCAP, Document for: Approval. Section 8.12.3.2. 39 pages.

3GPP RAN WG2 Meeting #113bis electronic R2-2102809, Online, Apr. 2021, Agenda Item: 8.7.4.1, Source: InterDigital Inc., Title: Connection Management for L2 Ue to NW Relays, Document for: Discussion, Decision. the whole document. 4 pages.

OPPO: "Discussion on NR sidelink relay UE (re-) selection", 3GPP Draft; R2-2103007, 3rd Generation Partnership Project (3GPP), Mobile Competence Centre; 650, Route Des Lucioles; F-06921 Sophia-Antipolis Cedex; France, vol. RAN WG2, No. electronic; Apr. 12, 2021-Apr. 20, 2021, Apr. 1, 2021 (Apr. 1, 2021), XP051991992, paragraph 2.2.

Supplementary European Search Report in the European application No. 21950414.9, mailed on Sep. 2, 2024. 11 pages.

* cited by examiner

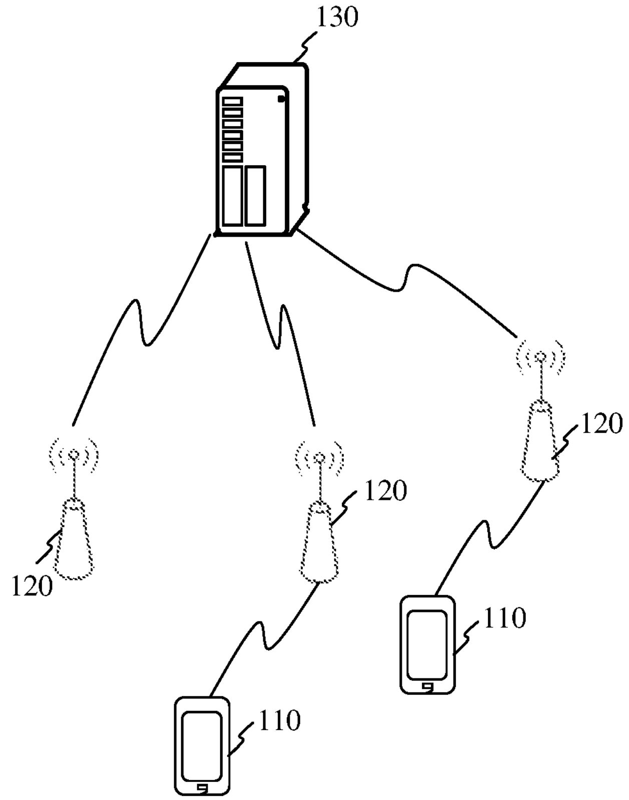

FIG. 1

201: A first RRM measurement criterion corresponding to a first relay sidelink terminal is acquired. The first relay sidelink terminal is a relay sidelink terminal serving the non-relay sidelink terminal

↓

202: A first RRM measurement processing is performed on a second relay sidelink terminal, other than the first relay sidelink terminal, in relay sidelink terminals, in response to measuring that channel quality associated with the first relay sidelink terminal meets the first RRM measurement criterion. The second relay sidelink terminal has a serving range covering the non-relay sidelink terminal

FIG. 2

METHODS FOR PROCESSING RADIO RESOURCE MANAGEMENT MEASUREMENT AND NETWORK SIDE DEVICE

CROSS-REFERENCE TO RELATED APPLICATION

This application is a continuation of International Patent Application No. PCT/CN2021/107192, filed on Jul. 19, 2021, the disclosure of which is hereby incorporated by reference in its entirety.

BACKGROUND

Sidelink technology is near field communication technology where terminals perform information direct connection through radio interfaces of the terminals.

In a relay sidelink scene, a non-relay sidelink terminal may perform, with a certain interval, a radio resource management (RRM) measurement on a sidelink terminal other than a relay sidelink terminal currently serving the non-relay sidelink terminal.

However, the process of performing the RRM measurement with the certain interval may consume a lot of power resources, impacting endurance capacity of the non-relay sidelink terminal.

SUMMARY

The disclosure relates to the field of wireless communication, and particularly to methods for processing a radio resource management (RRM) measurement and a network side device. The technical solution is as follows.

In a first aspect, there is provided a method for processing an RRM measurement. The method is performed by a non-relay sidelink terminal. The method includes the following operations.

A first RRM measurement criterion corresponding to a first relay sidelink terminal is acquired. The first relay sidelink terminal is a relay sidelink terminal serving the non-relay sidelink terminal.

In response to measuring that channel quality associated with the first relay sidelink terminal meets the first RRM measurement criterion, a first RRM measurement processing is performed on a second relay sidelink terminal, other than the first relay sidelink terminal, in relay sidelink terminals. The second relay sidelink terminal has a serving range covering the non-relay sidelink terminal.

In a second aspect, there is provided a method for processing an RRM measurement. The method is performed by a first relay sidelink terminal. The method includes the following operation.

Measurement criterion indication information is sent to a non-relay sidelink terminal The first relay sidelink terminal is a relay sidelink terminal serving the non-relay sidelink terminal. The measurement criterion indication information is used for instructing the non-relay sidelink terminal to acquire a first RRM measurement criterion corresponding to the first relay sidelink terminal, such that the non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The second relay sidelink terminal has a serving range covering the non-relay sidelink terminal.

In a third aspect, there is provided a network side device. The network side device includes a processor, a memory, and a transceiver.

The transceiver is controlled by the processor to send measurement criterion configuration information to a sidelink terminal. The measurement criterion configuration information is used for instructing the sidelink terminal to acquire a first RRM measurement criterion corresponding to a first relay sidelink terminal, such that a non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The first relay sidelink terminal is a relay sidelink terminal serving the non-relay sidelink terminal. The second relay sidelink terminal has a serving range covering the non-relay sidelink terminal.

It should be understood that the general description above and the detailed description below are illustrative only, and do not limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

FIG. 1 is a schematic diagram of an implementation environment according to an exemplary embodiment of the disclosure.

FIG. 2 is a flowchart of a method for processing an RRM measurement according to an exemplary embodiment.

DETAILED DESCRIPTION

Figure 3:
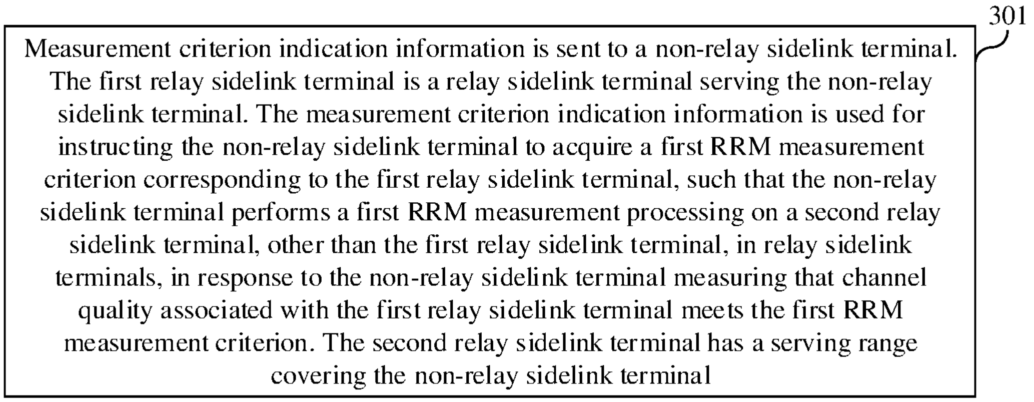
FIG. 3 is a flowchart of a method for processing an RRM measurement according to an exemplary embodiment.

Exemplary embodiments, examples of which are illustrated in the drawings, are described hereinafter in detail. In the following description of the drawings, identical or similar elements in different drawings are denoted by identical reference numerals unless indicated otherwise. Implementations set forth in the following exemplary embodiments do not represent all implementations in accordance with the disclosure. Rather, the implementations are mere examples of the apparatus and method in accordance with certain aspects, as recited in the claims, of the disclosure.

It should be understood that the phrase “a number of” means one or more, and the phrase “multiple” means two or more. The term “and/or” describes an association between associated objects, including three possible relationships. For example, by A and/or B, it may mean that there may be three cases, namely: only A exists, both A and B exist, or only B exists. A slash mark “/” generally denotes an “or” relationship between two associated objects that come respectively before and after the mark per se.

FIG. 1 is a diagram of an implementation environment involved in a method for processing an RRM measurement according to an exemplary embodiment of the disclosure. As shown in FIG. 1, the implementation environment may include several user devices 110 and base stations 120.

The user device 110 is a wireless communication device that supports sidelink transmission with multiple radio access technologies. For example, the user device 110 may support a cellular mobile communication technology, such as the 5th generation mobile communication (5G) technology. Alternatively, the user device 110 may also support a next generation mobile communication technology of the 5G technology.

Two user devices 110 may perform sidelink transmission with each other directly, or through another user device 110 serving as a relay. The latter case is also referred to as a relay sidelink scene.

For example, the user device 110 may be an onboard communication device, such as an onboard computer having a wireless communication function, or an external wireless communication device connecting to an onboard computer.

Alternatively, the user device 110 may also be a roadside device, such as a streetlight, a signal light, or another roadside device, that has a wireless communication function.

Alternatively, the user device 110 may also be a user terminal device, such as a mobile phone (also referred to as a “cellular” phone), as well as a computer provided with a mobile terminal, such as a mobile apparatus that is portable, pocket-sized, handheld, built in a computer, or onboard. For example, the user device may be a station (STA), a subscriber unit, a subscriber station, a mobile station, a mobile, a remote station, an access point, a remote terminal, an access terminal, a user terminal, a user agent, a user device, or user equipment (UE). Specifically, for example, the user device 110 may be a mobile terminal such as a smart mobile phone, a pad, an E-book reader, etc., or a smart wearable device such as smart glasses, a smart watch, a smart bracelet, etc.

The base station 120 may be a network side device in a wireless communication system. The wireless communication system may also be the 5G system, also referred to as a new radio (NR) system. Alternatively, the wireless communication system may also be the next generation system of the 5G system.

The base station 120 may be a base station (next generation NodeB, gNB) adopting a centralized and distributed architecture in the 5G system. A base station 120 adopting the centralized and distributed architecture generally includes a central unit (CU) and at least two distributed units (DUs). The central unit may be provided with protocol stacks of a packet data convergence protocol (PDCP) layer, a radio link control (RLC) layer, and a media access control (MAC) layer. A DU may be provided with a protocol stack of a physical (PHY) layer. The specific implementation of the base station 120 is not limited in embodiments of the disclosure.

A radio connection between a base station 120 and a user device 110 may be set up through a radio air interface. The radio air interface may be based on a 5G standard. For example, the radio air interface is an NR. Alternatively, the radio air interface may also be based on a standard of a next generation mobile communication network technology of 5G.

In an embodiment, the foregoing wireless communication system may further include a network managing device 130.

Several base stations 120 may be connected respectively to the network managing device 130. The network managing device 130 may be a core network device in the wireless communication system. For example, the network managing device 130 may be a mobility management entity (MME) in an evolved packet core (EPC). Alternatively, the network managing device may also be another core network device, such as a serving gateway (SGW), a public data network gateway (PGW), a policy and charging rules function (PCRF), a home subscriber server (HSS), etc. A form of implementation of the network managing device 130 is not limited in embodiments of the disclosure.

In the 5G system, a new radio resource control (RRC) state, i.e., an RRC inactive state RRC_INACTIVE, is defined to reduce air interface signalings, recover a radio connection quickly, recover a data service quickly, etc. This state differs from an RRC idle state RRC_IDLE and an RRC connected state RRC_CONNECTED.

In an RRC_IDLE state, mobility is based on cell selection/reselection by the UE. Paging may be initiated by a core network. A paging area may be configured by the core network. A base station has no UE context and there is no RRC connection.

In an RRC_CONNECTED state, there is an RRC connection, and both the base station and the UE have the UE context. The network side knows that the UE is located in a specific cell. Mobility is controlled by the network side. Unicast data may be transmitted between the UE and the base station.

In the RRC_INACTIVE state, mobility is based on cell selection/reselection by the UE. There is a connection between the core network and the NR. The UE context is in a certain base station. Paging is triggered by a radio access network (RAN), an RAN-based paging area is managed by the RAN. The network side knows that the UE is located in an RAN-based paging area.

RRM measurement by UE in an unconnected state (such as the RRC idle state or the RRC inactive state): in the NR system, a terminal in the unconnected state may have to perform RRM measurement on a serving cell and another neighbor cell based on a configuration by the network to support a mobility operation, such as cell reselection, etc.

The UE in the unconnected state may perform measurement on the serving cell continuously.

In an NR release 15 (NR Rel-15), to conserve energy of the terminal, when a channel in the serving cell of the UE is of a high quality, the UE may not initiate RRM measurement for an intra-frequency and an inter-frequency/inter-technology frequency with the same priority or a lower priority, and perform relaxed RRM measurement for an inter-frequency/inter-technology frequency with a higher priority. The UE may close measurement on all intra-frequency neighbor cells when the Srxlev (receiving power in cell search) measured in the serving cell is higher than $S_{IntraSearchP}$ and the Squal (quality of the received signal in cell search) is higher than $S_{IntraSearchQ}$ for the intra-frequency frequency.

The UE may close measurement for all NR inter-frequency (or inter-technology) frequency of a lower priority or the same priority when the Srxlev measured in the serving cell is higher than $S_{nonIntraSearchP}$ and the Squal is higher than $S_{nonIntraSearchQ}$ for the NR inter-frequency (or inter-technology) frequency with the lower priority or the same priority.

The UE may perform a relaxed measurement for an NR inter-frequency (or inter-technology) frequency with a higher priority when the Srxlev measured in the serving cell is higher than $S_{nonIntraSearchP}$, and the Squal is higher than $S_{nonIntraSearchQ}$ for the NR inter-frequency (or inter-technology) frequency with the higher priority. In this case, a measurement spacing for each frequency with the higher priority may be relaxed to be $T_{higher\_priority\_search}$=(60*$N_{layers}$) seconds (s), where $N_{layers}$ may be a number of frequencies with higher priorities broadcast by the network.

Parameters $S_{IntraSearchP}$, $S_{IntraSearchQ}$, $S_{nonIntraSearchP}$, and $S_{nonIntraSearchQ}$ may be configured by the network through a system information block (SIB) 2.

In NR, cell measurement requirements may include $T_{detect}$, $T_{measure}$, and $T_{evaluate}$, which are time spent on cell detection, cell measurement, and cell evaluation, respectively. In general, the requirements relate to a discontinuous reception (DRX) cycle of the terminal.

In R16, a mechanism of neighbouring cell measurement relaxation by UE in the unconnected state is introduced, to further meet the demand of saving power of the terminal.

A low mobility criterion and a not-at-cell-edge criterion are introduced to support relaxed neighbouring cell measurement. Both criteria may be weighed with a result of measurement performed by the UE on the serving cell. Currently, the low mobility criterion and the not-at-cell-edge criterion may be defined with reference to the content as follows.

1) For the low mobility criterion, also referred to as a stationary criterion, the network may configure an evaluation duration $T_{SearchDeltaP}$ for evaluating a change in reference signal receiving power (RSRP) and a threshold $S_{SearchDeltaP}$ for the change in the RSRP. The UE may be determined to meet the low mobility criterion when the change in the RSRP of the UE on the serving cell is less than $S_{SearchDeltaP}$ within a duration $T_{searchDeltaP}$. That is, the following condition is met within the duration $T_{SearchDeltaP}$:

$$(Srxlev\mathrm{Ref}-Srxlev)<S_{SearchDeltaP} \quad (1)$$

where Srxlev is an Srxlev measurement value currently measured on the serving cell, and SrxlevRef is a reference Srxlev value for the serving cell.

The UE may perform following operations when the UE selects or reselects a new cell, or if (Srxlev−SrxlevRef)>0, or if the UE fails to meet the formula (1) within the duration TSearchDeltaP.

The UE may set SrxlevRef to the Srxlev value currently measured on the serving cell.

The UE may perform a normal RRM measurement within at least the duration TSearchDeltaP after completing cell selection/reselection.

2) For the not-at-cell-edge criterion, the network may configure an RSRP threshold $S_{SearchThresholdP}$, as well as a reference signal received quality (reference signal receiving quality, RSRQ) threshold $S_{SearchThresholdQ}$. The UE may be determined to meet the not-at-cell-edge criterion when the RSRP of the UE on the serving cell is greater than the RSRP threshold, and the RSRQ of the UE on the serving cell is greater than the RSRQ threshold (in case the RSRQ threshold is configured by the network).

The network may notify the UE, by means of system broadcasting, whether RRM measurement relaxation is enabled. The network may configure at least one criterion for initiating RRM measurement relaxation in case that RRM measurement relaxation is enabled. There may be following four cases for different configurations.

In first case, the network configures only the low mobility criterion. In this case, UE may initiate a relaxed RRM measurement on a neighbouring cell when the UE meets the low mobility criterion.

In second case, the network configures only the not-at-cell-edge criterion. UE may perform a relaxed RRM measurement on a neighbouring cell when the UE meets the not-at-cell-edge criterion.

In third case, the network configures both the low mobility criterion and the not-at-cell-edge criterion, but no parameter combineRelaxedMeasCondition is configured. In this case, UE may initiate a relaxed RRM measurement on a neighbouring cell when the UE meets at least one of the two criteria.

In fourth case, the network configures both the low mobility criterion and the not-at-cell-edge criterion, as well as the parameter combineRelaxedMeasCondition. In this case, UE may initiate a relaxed RRM measurement on a neighbouring cell when the UE meets both the two criteria.

UE in the unconnected state may perform the RRM measurement relaxation with two methods as follows.

First method: a measurement spacing for intra-frequency measurement, NR inter-frequency measurement and inter-technology inter-frequency measurement may be relaxed to be three times a normal measurement spacing when the UE meets just one of the low mobility criterion or the not-at-cell-edge criterion.

Second method: the measurement spacing for intra-frequency measurement, NR inter-frequency measurement and inter-technology inter-frequency measurement may be relaxed to be one hour when the UE meets both the low mobility criterion and the not-at-cell-edge criterion.

In addition, a parameter highPriorityMeasRelax is introduced for a frequency with a high priority. The parameter may indicate whether the network allows the UE to relax the measurement spacing for the frequency with the high priority to be more than $T_{higher\_priority\_search}$ (except for the case that the UE meets both the low mobility criterion and the not-at-cell-edge criterion).

In other words, the parameter highPriorityMeasRelax may control a case where the network configures only the low mobility criterion, the UE meets the low mobility criterion, and a result of measurement by the UE on the serving cell shows that Srxlev is greater than $S_{nonIntraSearchP}$ and that Squal is greater than $S_{nonIntraSearchQ}$. In this case, the measurement spacing for measurement by the UE for the frequency with the high priority may be relaxed to be $K2*T_{higher\_priority\_search}$ if the network configures highPriorityMeasRelax, where K2 is 60. The measurement spacing for measurement by the UE for the frequency with the high priority is $T_{higher\_priority\_search}$ if the network configures no highPriorityMeasRelax.

In a relay sidelink scene, a non-relay sidelink terminal, such as an edge (remote) UE in the unconnected state, may have to perform an RRM measurement, in order to select a suitable serving relay UE (i.e., a relay UE). To save terminal power consumption, a solution for controlling a non-relay sidelink terminal to perform the RRM measurement is provided in embodiments of the disclosure hereinafter.

FIG. 2 is a flowchart of a method for processing an RRM measurement according to an exemplary embodiment. The method for processing the RRM measurement may be performed by a non-relay sidelink terminal. For example, the non-relay sidelink terminal may be a user device 110 in the implementation environment shown in FIG. 1. As shown in FIG. 2, the method includes the following operations.

At S201, a first RRM measurement criterion corresponding to a first relay sidelink terminal is acquired. The first relay sidelink terminal is a relay sidelink terminal serving the non-relay sidelink terminal.

In embodiments of the disclosure, in the relay sidelink scene, the non-relay sidelink terminal (remote UE) located in a serving area range of a relay sidelink terminal may acquire the first RRM measurement criterion corresponding to the relay sidelink terminal.

The fact that first relay sidelink terminal is a relay sidelink terminal serving the non-relay sidelink terminal, may mean that the first relay sidelink terminal provides the non-relay sidelink terminal with a sidelink relay service. In other words, the non-relay sidelink terminal is served by the first relay sidelink terminal.

In a possible implementation, the non-relay sidelink terminal is in a connected state when a sidelink connection, such as a PC5-radio resource control (PC5-RRC) connection, is set up between the non-relay sidelink terminal and the first relay sidelink terminal. Alternatively, the non-relay sidelink terminal is in an unconnected state when no sidelink connection is set up between the non-relay sidelink terminal and the first relay sidelink terminal. The non-relay sidelink terminal may receive a system message and/or a paging message sent by the first relay sidelink terminal. In the two cases, it may be determined that the non-relay sidelink terminal is served by the first relay sidelink terminal.

At S202, a first RRM measurement processing is performed on a second relay sidelink terminal, other than the first relay sidelink terminal, in relay sidelink terminals, in response to measuring that channel quality associated with the first relay sidelink terminal meets the first RRM measurement criterion. The second relay sidelink terminal has a serving range covering the non-relay sidelink terminal.

In a possible implementation, the first RRM measurement processing includes stopping an RRM measurement, or performing a relaxed RRM measurement.

The first RRM measurement criterion may include a requirement of performing the first RRM measurement processing on the second relay sidelink terminal, other than the current serving relay sidelink terminal, in relay sidelink terminals around the remote UE. For example, the first RRM measurement criterion includes a channel quality threshold for triggering the first RRM measurement processing.

In the embodiments of the disclosure, the remote UE in the unconnected state may measure the channel quality associated with the first relay sidelink terminal. The channel quality may include at least one of the RSRP or the RSRQ. A requirement for initiating the first RRM measurement processing is met when it is measured that the the channel quality meets the first RRM measurement criterion, such as when the measured channel quality is higher than the channel quality threshold in the first RRM measurement criterion. In this case, the remote UE may stop performing the RRM measurement on a relay sidelink terminal other than the current relay sidelink terminal, or perform the relaxed RRM measurement on the relay sidelink terminal other than the current relay sidelink terminal.

In a possible implementation, the non-relay sidelink terminal may perform the RRM measurement on the relay sidelink terminal other than the first relay sidelink terminal with a first measurement spacing when the non-relay sidelink terminal measures that the channel quality associated with the first relay sidelink terminal does not meet the first RRM measurement criterion. The relaxed RRM measurement may correspond to a second measurement spacing, and the second measurement spacing is greater than the first measurement spacing. For example, the second measurement spacing is a specified multiple (such as 60 times) of the first measurement spacing. Alternatively, the second measurement spacing may be an interval with a specified duration (such as one hour).

In embodiments of the disclosure, the measurement spacing for performing the relaxed RRM measurement is greater than the measurement spacing for performing the normal RRM measurement. That is, the non-relay sidelink terminal may perform the RRM measurement on the relay sidelink terminal other than the first relay sidelink terminal with the first measurement spacing when the non-relay sidelink terminal measures that the channel quality associated with the first relay sidelink terminal does not meet the first RRM measurement criterion. The non-relay sidelink terminal may stop performing the RRM measurement on the relay sidelink terminal other than the first relay sidelink terminal or perform the RRM measurement on the relay sidelink terminal other than the first relay sidelink terminal with the second measurement spacing when the non-relay sidelink terminal measures that the channel quality associated with the first relay sidelink terminal meets the first RRM measurement criterion.

In a possible implementation, the first RRM measurement criterion includes at least one of a not-at-cell-edge criterion or a low mobility criterion.

Accordingly, with the solution according to embodiments of the disclosure, a non-relay sidelink terminal being served by a first relay sidelink terminal acquires a first RRM measurement criterion corresponding to the first relay sidelink terminal. Then, the non-relay sidelink terminal performs corresponding first RRM measurement processing when channel quality measured on the first relay sidelink terminal meets the first RRM measurement criterion. That is, an RRM measurement processing performed by the non-relay sidelink terminal can be controlled by an RRM measurement criterion, thereby improving flexibility of the RRM measurement, balancing performance of the RRM measurement and power consumption of the terminal. Therefore, power consumption in performing the RRM measurement on another relay sidelink terminal by the non-relay sidelink terminal can be reduced, and endurance capacity of the non-relay sidelink terminal can be improved.

FIG. 3 is a flowchart of a method for processing an RRM measurement according to an exemplary embodiment. The method for processing the RRM measurement may be performed by a first relay sidelink terminal. For example, the first relay sidelink terminal may be a user device 110 in the implementation environment shown in FIG. 1. As shown in FIG. 3, the method includes the following operations.

At S301, measurement criterion indication information is sent to a non-relay sidelink terminal. The first relay sidelink terminal is a relay sidelink terminal serving the non-relay sidelink terminal. The measurement criterion indication information is used for instructing the non-relay sidelink terminal to acquire a first RRM measurement criterion corresponding to the first relay sidelink terminal, such that the non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The second relay sidelink terminal has a serving range covering the non-relay sidelink terminal.

In a possible implementation, the first RRM measurement processing includes stopping an RRM measurement, or performing a relaxed RRM measurement.

In a possible implementation, the first RRM measurement criterion includes at least one of a not-at-cell-edge criterion or a low mobility criterion.

Accordingly, with the solution according to embodiments of the disclosure, a first relay sidelink terminal may indicate a first RRM measurement criterion corresponding to the first relay sidelink terminal, through measurement criterion indication information, to a non-relay sidelink terminal being served by the first relay sidelink terminal. Then, the non-relay sidelink terminal may perform a corresponding first RRM measurement processing when channel quality measured by the non-relay sidelink terminal on the first relay sidelink terminal meets the first RRM measurement criterion. That is, an RRM measurement processing performed by the non-relay sidelink terminal can be controlled by an RRM measurement criterion, thereby improving flexibility of the RRM measurement, balancing performance of the RRM measurement and power consumption of the terminal. Therefore, power consumption in performing the RRM measurement on another relay sidelink terminal by the non-relay sidelink terminal can be reduced, and endurance capacity of the non-relay sidelink terminal can be improved.

In the foregoing embodiment shown in FIG. 2 or FIG. 3, the first RRM measurement criterion may be initiated by a network side device.

Figure 4:
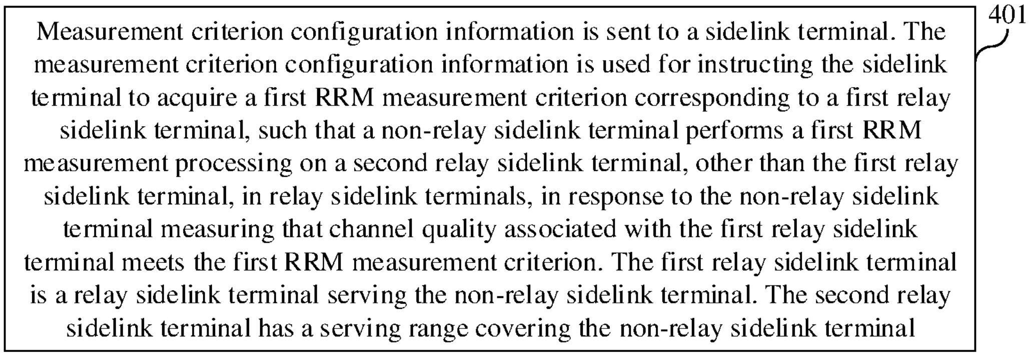
FIG. 4 is a flowchart of a method for processing an RRM measurement according to an exemplary embodiment.

FIG. 4 is a flowchart of a method for processing an RRM measurement according to an exemplary embodiment. The method for processing the RRM measurement may be performed by a network side device. For example, the network side device may be a base station 120 or a network managing device 130 in the implementation environment shown in FIG. 1. As shown in FIG. 4, the method may include the following operation.

At S401, measurement criterion configuration information is sent to a sidelink terminal. The measurement criterion configuration information is used for instructing the sidelink terminal to acquire a first RRM measurement criterion corresponding to a first relay sidelink terminal, such that a non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The first relay sidelink terminal is a relay sidelink terminal serving the non-relay sidelink terminal. The second relay sidelink terminal has a serving range covering the non-relay sidelink terminal.

In a possible implementation, the first RRM measurement processing includes stopping a RRM measurement, or performing a relaxed RRM measurement.

The sidelink terminal may be at least one of the first relay sidelink terminal or the non-relay sidelink terminal.

In embodiments of the disclosure, when the sidelink terminal is the first relay sidelink terminal, the first relay sidelink terminal may configure the first RRM measurement criterion to the non-relay sidelink terminal after the first relay sidelink terminal acquiring the first RRM measurement criterion.

In a possible implementation, the operation that the measurement criterion configuration information is sent to the sidelink terminal may include the following operation. The measurement criterion configuration information is sent to the sidelink terminal by means of broadcasting.

Alternatively, the measurement criterion configuration information is sent to the sidelink terminal through a dedicated signalling.

Accordingly, with the solution according to embodiments of the disclosure, a network side device may initiate, through measurement criterion configuration information, a process of configuring a first RRM measurement criterion corresponding to a first relay sidelink terminal to a non-relay sidelink terminal being served by the first relay sidelink terminal. Then, the non-relay sidelink terminal may perform a corresponding first RRM measurement processing when channel quality measured on the first relay sidelink terminal meets the first RRM measurement criterion. That is, an RRM measurement processing performed by the non-relay sidelink terminal can be controlled by an RRM measurement criterion, thereby improving flexibility of the RRM measurement, balancing performance of the RRM measurement and power consumption of the terminal. Therefore, power consumption in performing RRM measurement on another relay sidelink terminal by the non-relay sidelink terminal can be reduced, and endurance capacity of the non-relay sidelink terminal can be improved.

In the foregoing embodiments shown in FIG. 2 and FIG. 4, the first RRM measurement criterion corresponding to the first relay sidelink terminal may be configured by the network side device to the non-relay sidelink terminal.

Alternatively, with reference to the embodiment shown in FIG. 2, the embodiment shown in FIG. 3, and the embodiment shown in FIG. 4, the first RRM measurement criterion may also be configured to the non-relay sidelink terminal by the first relay sidelink terminal.

Alternatively, with reference to the embodiment shown in FIG. 2, the embodiment shown in FIG. 3, and the embodiment shown in FIG. 4, the first RRM measurement criterion may also be configured to the non-relay sidelink terminal by the network side device and the first relay sidelink terminal cooperating with each other.

Alternatively, with reference to the embodiment shown in FIG. 2, the embodiment shown in FIG. 3, and the embodiment shown in FIG. 4, the first RRM measurement criterion may also be configured to the non-relay sidelink terminal by the network side device and the first relay sidelink terminal, respectively.

With reference to embodiments shown in FIG. 2 to FIG. 4, in a possible implementation, the first RRM measurement criterion may also be configured to the non-relay sidelink terminal directly by the first relay sidelink terminal.

Figure 5:
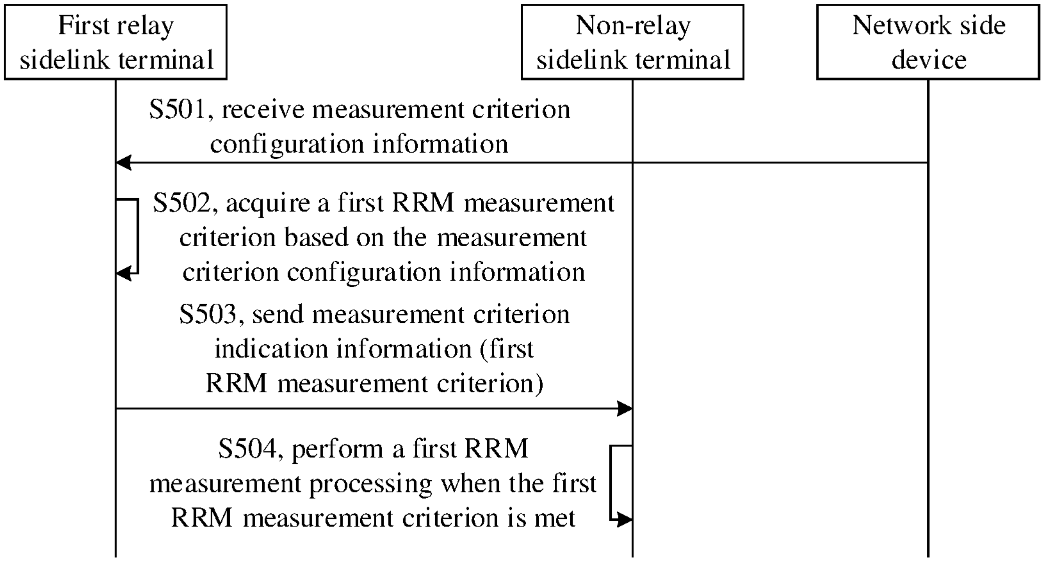
FIG. 5 is a flowchart of a method for processing an RRM measurement according to an exemplary embodiment.

FIG. 5 is a flowchart of a method for processing an RRM measurement according to an exemplary embodiment. The method for processing the RRM measurement may be performed by a first relay sidelink terminal and a non-relay sidelink terminal interactively. For example, the first relay sidelink terminal and the non-relay sidelink terminal may be user devices 110 in the implementation environment shown in FIG. 1. As shown in FIG. 5, the method may include the following operations.

At S501, a first relay sidelink terminal receives measurement criterion configuration information sent by a network side device.

In embodiments of the disclosure, the network side device may send the measurement criterion configuration information to the first relay sidelink terminal, to configure a measurement criterion to the first relay sidelink terminal.

The foregoing network side device may be a base station, or another network managing device in the core network.

In a possible implementation, the operation that the first relay sidelink terminal receives the measurement criterion configuration information sent by the network side device may include the following operation.

The first relay sidelink terminal may receive the measurement criterion configuration information from the network side device by means of broadcasting.

Alternatively, the first relay sidelink terminal may receive the measurement criterion configuration information sent by the network side device through a dedicated signalling.

In an illustrative solution according to embodiments of the disclosure, the network side device may send the measurement criterion configuration information to the first relay sidelink terminal within a coverage range of a cell corresponding to the network side device through a broadcast message.

For example, the network side device broadcasts an SIB including the measurement criterion configuration information. The first relay sidelink terminal may receive the SIB, and acquire the measurement criterion configuration information in the SIB.

In another illustrative solution according to embodiments of the disclosure, the network side device may send the measurement criterion configuration information to the first relay sidelink terminal through a dedicated signaling of the terminal.

For example, the network side device may send the measurement criterion configuration information to the first relay sidelink terminal through an RRC signalling when the first relay sidelink terminal has an RRC connection with the network side device and the first relay sidelink terminal is in an RRC connected state.

The RRC signalling may be an existing RRC signalling in the system, or a new RRC signalling.

At S502, the first relay sidelink terminal acquires a first RRM measurement criterion based on the measurement criterion configuration information.

In a possible implementation, the first RRM measurement criterion includes at least one of a not-at-cell-edge criterion or a low mobility criterion.

The contents and application of the not-at-cell-edge criterion and the low mobility criterion may refer to the low mobility criterion and the not-at-cell-edge criterion introduced in foregoing content of the disclosure. For example, the contents and application of the not-at-cell-edge criterion and the low mobility criterion may be identical to those of the low mobility criterion and the not-at-cell-edge criterion defined in R16, or may be modified appropriately for the relay sidelink scene based on the low mobility criterion and the not-at-cell-edge criterion defined in R16.

In a possible implementation, when the first RRM measurement criterion includes the not-at-cell-edge criterion, the measurement criterion configuration information includes N RRM measurement criteria and transmitting power information corresponding to the N RRM measurement criteria. N is a positive integer.

Each of the N RRM measurement criteria may correspond to one or more pieces of transmitting power information. That is, the measurement criterion configuration information may include N RRM measurement criteria and M pieces of transmitting power information. Each RRM measurement criterion may correspond to one or more pieces of the M pieces of transmitting power information. In addition, different RRM measurement criteria may correspond to different pieces of transmitting power information, respectively.

The operation that the first relay sidelink terminal acquires the first RRM measurement criterion based on the measurement criterion configuration information may include the following operation.

The first relay sidelink terminal may acquire an RRM measurement criterion corresponding to first transmitting power information of the first relay sidelink terminal as the first RRM measurement criterion based on the measurement criterion configuration information.

At present, the NR system supports UE power classes of 23 dBm and 26 dBm. An even lower UE power class may be introduced subsequently for a terminal of reduced capability (RedCap), to further save power consumption of the terminal. Therefore, in the sidelink scene, different sidelink terminals may correspond to different pieces of transmitting power information, respectively, while in the relay sidelink scene, different RRM measurement criteria may be required for relay sidelink terminals with different pieces of transmitting power information, respectively.

In an illustrative solution according to embodiments of the disclosure, when the first RRM measurement criterion includes the not-at-cell-edge criterion, the network side device may configure the first relay sidelink terminal with one or more RRM measurement criteria as well as transmitting power information corresponding to each of the RRM measurement criteria. Accordingly, the first relay sidelink terminal may select an RRM measurement criterion applicable to the first relay sidelink terminal as the first RRM measurement criterion based on its own transmitting power information and transmitting power information corresponding to each of the RRM measurement criteria.

The transmitting power information may include a maximum transmitting power or a transmitting power class.

In a possible implementation, each of the at least one not-at-cell-edge criterion may include an RSRP threshold, and optionally, may further include an RSRQ threshold. Each of the at least one not-at-cell-edge criterion may correspond to at least one UE transmitting power class (UE power class).

The first relay sidelink terminal may be explicitly or implicitly notified of a correspondence between the at least one not-at-cell-edge criterion and the at least one UE power class.

The explicit notification may apply to a case where one not-at-cell-edge criterion corresponds to at least one UE power class, which may be implemented by direct notification by means of network broadcasting.

The implicit notification may apply to a one-to-one correspondence between a not-at-cell-edge criterion and a UE power class. For example, the measurement criterion configuration information sent by the network side device to the first relay sidelink terminal includes N not-at-cell-edge criteria and N UE power classes. The correspondence between the N not-at-cell-edge criteria and the N UE power classes may be determined by the following manner.

The N not-at-cell-edge criteria may be sorted in a descending order of the RSRP/RSRQ thresholds. Meanwhile, the N UE power classes may be sorted in a descending order of powers. The sorted n-th not-at-cell-edge criterion corresponds to the sorted n-th UE power class, where $1 \le n \le N$, and both n and N are integers.

In a possible implementation, when the first RRM measurement criterion includes the not-at-cell-edge criterion, the measurement criterion configuration information includes a reference RRM measurement criterion and reference transmitting power information.

The operation that the first relay sidelink terminal acquires the first RRM measurement criterion based on the measurement criterion configuration information may include the following operation.

The first relay sidelink terminal may acquire the first RRM measurement criterion based on an offset between first transmitting power information of the first relay sidelink terminal and the reference transmitting power information, and the reference RRM measurement criterion.

In an illustrative solution according to embodiments of the disclosure, when the first RRM measurement criterion includes the not-at-cell-edge criterion, the network side device may provide the first relay sidelink terminal with a single reference RRM measurement criterion and reference transmitting power information corresponding to the reference RRM measurement criterion. Accordingly, the first relay sidelink terminal may derive an RRM measurement criterion applicable to the first relay sidelink terminal as the first RRM measurement criterion based on its own transmitting power information, the reference RRM measurement criterion and the reference transmitting power information. For example, the first relay sidelink terminal determines, based on an offset (offset 1) between its own transmitting power information and the reference transmitting power information, an offset (offset 2) between a parameter in an RRM measurement criterion applicable to the first relay sidelink terminal and a parameter in the reference RRM measurement criterion. Then, the first relay sidelink terminal may acquire the RRM measurement criterion applicable to the first relay sidelink terminal based on the offset 2 and the reference RRM measurement criterion.

For example, the network side device configures the first relay sidelink terminal with a not-at-cell-edge criterion. The not-at-cell-edge criterion may include an RSRP threshold, and optionally, may further include an RSRQ threshold. The not-at-cell-edge criterion may correspond to a default UE power class, such as a maximum UE transmitting power of 23 dBm.

The first relay sidelink terminal may determine, based on a not-at-cell-edge criterion sent through network broadcasting or an RRC signalling and a transmitting power class of the first relay sidelink terminal, a first not-at-cell-edge criterion corresponding to a serving range of the first relay sidelink terminal. A difference between an RSRP/RSRQ threshold corresponding to the first not-at-cell-edge criterion and an RSRP/RSRQ threshold corresponding to the not-at-cell-edge criterion sent through the network broadcasting or RRC signalling may be denoted by offset (corresponding to the offset 2 mentioned above). The value of the offset may be related to a UE power class. The offset may be determined through the following manners.

In first manner, the offset may be determined the through network broadcasting/RRC signalling. That is, the network may configure an offset value of an RSRP/RSRQ threshold for each UE power class other than the default UE power class.

For example, in addition to the reference RRM measurement criterion and the reference transmitting power information, the measurement criterion configuration information may further include the offset value. The relay UE or the remote UE may determine an RSRP/RSRQ threshold in the first RRM measurement criterion based on the offset value corresponding to the transmitting power class of the relay UE and the RSRP/RSRQ threshold in the reference RRM measurement criterion.

In second manner, the offset may be determined implicitly. For example, the UE determines the offset value based on the offset between the maximum transmitting power of the UE and the maximum transmitting power corresponding to the default UE power class. For example, the not-at-cell-edge criterion broadcast by the network corresponds to a UE maximum transmitting power of 23 dBm. The maximum transmitting power of the current UE is 20 dBm. Then the offset may be 3 dB. The UE may determine the RSRP/RSRQ threshold corresponding to the first not-at-cell-edge criterion to be the RSRP/RSRQ threshold broadcast by the network minus 3 dB.

In third manner, the offset may be determined as predefined in a standard. That is, an offset corresponding to two neighbouring pieces of UE transmitting power information may be predefined in the standard.

In fourth manner, the first manner and the second manner are combined. That is, the UE may determine an offset 1 based on the offset between the maximum transmitting power of the UE and the maximum transmitting power corresponding to the default UE power class. For example, the not-at-cell-edge criterion broadcast by the network corresponds to a UE maximum transmitting power of 23 dBm. The maximum transmitting power of the current UE is 20 dBm. Then, the offset 1 may be 3 dB. In addition, the network may configure an offset 2 of an RSRP/RSRQ threshold for each UE power class other than the default UE power class. Then, the UE may determine the RSRP/RSRQ threshold corresponding to the first not-at-cell-edge criterion to be: the RSRP/RSRQ threshold broadcast by the network−offset 1−offset 2, or the RSRP/RSRQ threshold broadcast by the network−offset 1+offset 2.

In a possible implementation, the measurement criterion configuration information indicates the first RRM measurement criterion.

In another illustrative solution according to embodiments of the disclosure, the measurement criterion configuration information further indicates the first RRM measurement criterion corresponding to the first relay sidelink terminal directly. Accordingly, the first relay sidelink terminal may acquire the first RRM measurement criterion applicable to the first relay sidelink terminal directly based on the measurement criterion configuration information.

In embodiments of the disclosure, when the measurement criterion configuration information indicates the first RRM measurement criterion directly, the measurement criterion configuration information may be configured to the first relay sidelink terminal by the network side device through a dedicated signalling (such as RRC signalling). For example, the first relay sidelink terminal reports the transmitting power information of the first relay sidelink terminal to the network side device through a random access signalling or an RRC signalling during or after a random access process. The network side device may select a first RRM measurement criterion applicable to the first relay sidelink terminal based on the transmitting power information reported by the first relay sidelink terminal, and notify the first relay sidelink terminal of the selected first RRM measurement criterion through an RRC signalling.

For example, the network side device sends a not-at-cell-edge criterion applicable to the first relay sidelink terminal to the first relay sidelink terminal through the RRC signalling. The not-at-cell-edge criterion may include an RSRP threshold, and optionally, may further include an RSRQ threshold. The manner of the network determining the RSRP/RSRQ threshold corresponding to the first not-at-cell-edge criterion based on the power class of the first relay sidelink terminal may depend on a network implementation, and is not limited in embodiments of the disclosure. The not-at-cell-edge criterion may be configured by the network side device through a dedicated signalling of the UE such as an RRC signalling.

The operation that the measurement criterion indication information includes the first RRM measurement criterion may mean that the measurement criterion indication information includes a complete content of the first RRM measurement criterion, or that the measurement criterion indication information includes an identification of the first RRM measurement criterion.

At S503, the first relay sidelink terminal sends the measurement criterion indication information to the non-relay sidelink terminal. The first relay sidelink terminal is a relay sidelink terminal serving the non-relay sidelink terminal. The measurement criterion indication information includes the first RRM measurement criterion. Accordingly, the non-relay sidelink terminal receives the first RRM measurement criterion sent by the first relay sidelink terminal.

The operation that first relay sidelink terminal sends the measurement criterion indication information to the non-relay sidelink terminal may include the following operation.

The first relay sidelink terminal may send the measurement criterion indication information by means of sidelink broadcasting.

Alternatively, the first relay sidelink terminal may send the measurement criterion indication information through a dedicated sidelink signalling.

The dedicated sidelink signalling may be a PC5-RRC signalling, an MAC) control element (CE) or physical sidelink control channel (PSCCH) signalling, etc.

In embodiments of the disclosure, the relay UE may configure the remote UE with an RRM measurement relaxation message (i.e., the measurement criterion indication information) through broadcasting or a dedicated signaling of the UE if the remote UE is in a connected state (that is, the remote UE has a PC5-RRC connection with the relay UE).

Otherwise, the relay UE may configure the remote UE with an RRM measurement relaxation message by broadcasting if the remote UE is in an unconnected state (i.e., the remote UE has no PC5-RRC connection with the relay UE).

Accordingly, the operation that the non-relay sidelink terminal receives the first RRM measurement criterion sent by the first relay sidelink terminal may include the following operation.

The non-relay sidelink terminal may receive the first RRM measurement criterion sent by the first relay sidelink terminal by means of sidelink broadcasting.

Alternatively, the non-relay sidelink terminal may receive the first RRM measurement criterion sent by the first relay sidelink terminal through a dedicated sidelink signalling.

At S504, the non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The second relay sidelink terminal has a serving range covering the non-relay sidelink terminal.

In a possible implementation, the first RRM measurement processing includes stopping an RRM measurement, or performing a relaxed RRM measurement.

In an illustrative solution according to embodiments of the disclosure, the network side device sends at least one not-at-cell-edge criterion by broadcasting or through a dedicated signalling. The at least one not-at-cell-edge criterion may correspond to at least one relay sidelink terminal (relay UE) transmitting power class. A relay UE may determine a first not-at-cell-edge criterion matching the relay UE based on its own transmitting power class, and may configure the first not-at-cell-edge criterion to a remote UE served by the relay UE by broadcasting or through an RRC signalling. The remote UE may close the RRM measurement on a neighbouring relay UE or initiate a relaxed RRM measurement on the neighbouring relay UE when the remote UE determines that a measurement result of an RSRP/RSRP on the serving relay UE meets the first not-at-cell-edge criterion.

Figure 6:
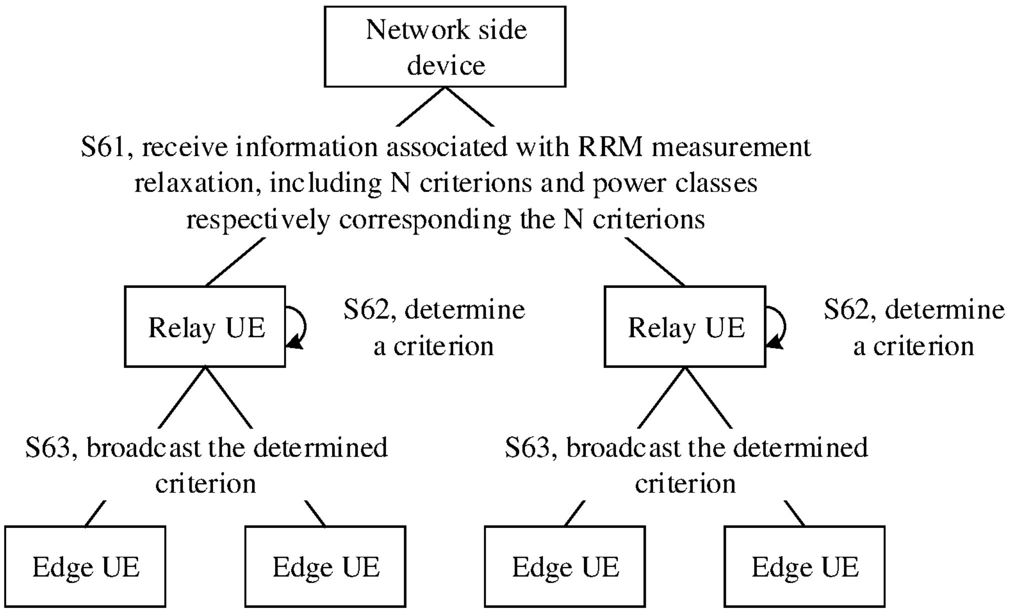
FIG. 6 is a diagram of a configuration of an RRM measurement criterion involved in the embodiment shown in FIG. 5.

FIG. 6 is a diagram of a configuration of an RRM measurement criterion according to embodiments of the disclosure. As shown in FIG. 6, the RRM measurement criterion may be configured as follows.

At S61, a relay UE receives information associated with RRM measurement relaxation broadcast by a network. The information associated with RRM measurement relaxation may include at least one not-at-cell-edge criterion, i.e., N criterion(s). Each of the at least one not-at-cell-edge criterion may correspond to at least one UE power class.

At S62, the relay UE determines a first not-at-cell-edge criterion corresponding to a serving range of the relay UE based on the at least one not-at-cell-edge criterion broadcast by the network, a correspondence between the at least one not-at-cell-edge criterion and at least one UE power class, and a transmitting power class of the relay UE.

At S63, the relay UE broadcasts the first not-at-cell-edge criterion. For example, the first not-at-cell-edge criterion may be broadcast in Prose Direct Discovery through a PC5-S or PC5-RRC signalling.

The remote UE may receive the first not-at-cell-edge criterion broadcast by the relay UE. The remote UE may measure channel quality associated with the serving relay UE. The remote UE may perform the following operations when the remote UE determines that a measurement result of an RSRP/RSRP on the serving relay UE meets the first not-at-cell-edge criterion.

First operation, the remote UE may close the RRM measurement on a neighbouring relay UE.

Second operation, the remote UE may initiate a relaxed RRM measurement on a neighbouring relay UE through, for example, increasing a measurement spacing to be M times of a normal measurement spacing, or using a fixed measurement spacing such as one hour, etc.

In another illustrative solution according to embodiments of the disclosure, the network side device broadcasts a not-at-cell-edge criterion for the remote UE. The not-at-cell-edge criterion corresponds to a default relay UE power class.

The relay UE may determine a first not-at-cell-edge criterion matching the relay UE based on its own transmitting power class. The relay UE may configure the first not-at-cell-edge criterion through broadcasting or a dedicated signalling. The remote UE may close an RRM measurement on a neighbouring relay UE or initiate a relaxed RRM measurement on the neighbouring relay UE when the remote UE determines that that a measurement result of an RSRP/RSRP on the serving relay UE meets the first not-at-cell-edge criterion.

Figure 7:
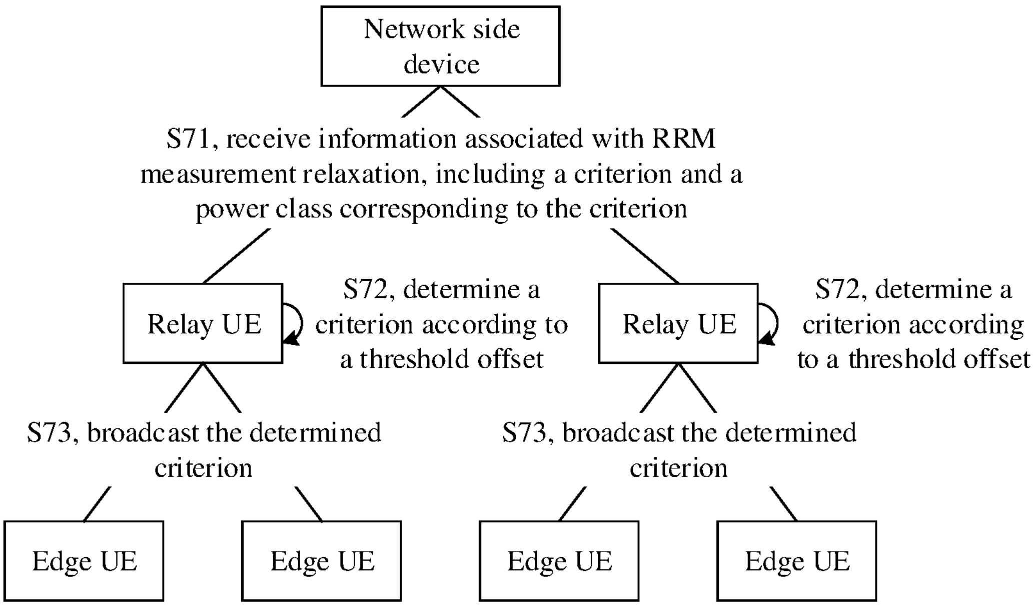
FIG. 7 is a diagram of a configuration of an RRM measurement criterion involved in the embodiment shown in FIG. 5.

FIG. 7 is a diagram of a configuration of an RRM measurement criterion according to embodiments of the disclosure. As shown in FIG. 7, an RRM measurement criterion may be configured as follows.

At S71, a relay UE receives information associated with RRM measurement relaxation broadcast by a network for remote UE in an unconnected state. The information associated with RRM measurement relaxation may include a not-at-cell-edge criterion. The not-at-cell-edge criterion may correspond to a default UE power class.

At S72, the relay UE determines a first not-at-cell-edge criterion corresponding to a serving range of the relay UE based on the not-at-cell-edge criterion broadcast by the network and its own transmitting power class. A difference between an RSRP/RSRQ threshold corresponding to the first not-at-cell-edge criterion and an RSRP/RSRQ threshold corresponding to the not-at-cell-edge criterion broadcast by the network may be denoted by offset. The value of the offset may be related to UE power class.

At S73, the relay UE broadcasts the first not-at-cell-edge criterion. For example, the first not-at-cell-edge criterion is broadcast in Prose Direct Discovery through a PC5-S or PC5-RRC signalling.

The remote UE receives the first not-at-cell-edge criterion broadcast by the relay UE. The remote UE measures channel quality associated with the serving relay UE. The remote UE may perform the following operations when the remote UE determines that a measurement result of an RSRP/RSRP on the serving relay UE meets the first not-at-cell-edge criterion.

First operation, the remote UE may close the RRM measurement on a neighbouring relay UE.

Second operation, the remote UE may initiate a relaxed RRM measurement on a neighbouring relay UE through, for example, increasing a measurement spacing to be M times of a normal measurement spacing, or using a fixed measurement spacing such as one hour, etc.

In another illustrative solution according to embodiments of the disclosure, a network side device may provide a relay UE in a connected state with a first not-at-cell-edge criterion through a dedicated signalling. The relay UE may configure the first not-at-cell-edge criterion by broadcasting or a dedicated signalling. The remote UE may close an RRM measurement on a neighbouring relay UE or initiate a relaxed RRM measurement on a neighbouring relay UE when the remote UE determines that a measurement result of an RSRP/RSRP on the serving relay UE meets the first not-at-cell-edge criterion.

Figure 8:
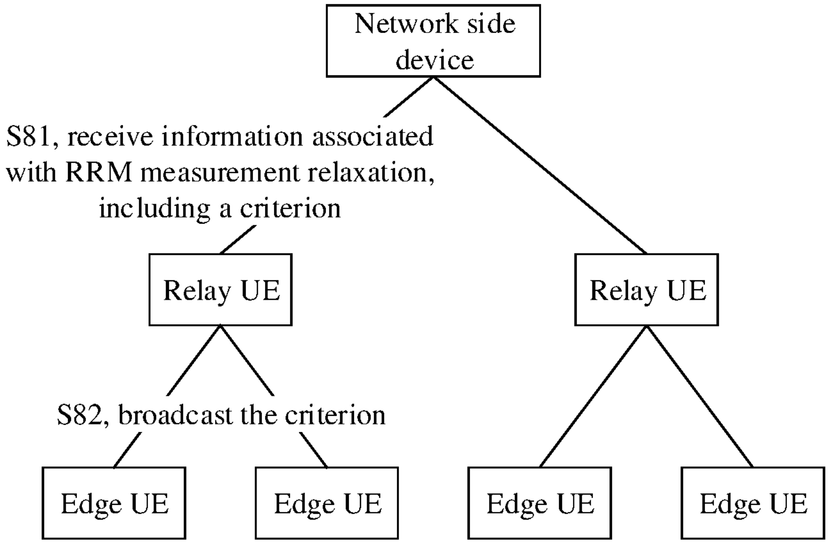
FIG. 8 is a diagram of a configuration of an RRM measurement criterion involved in the embodiment shown in FIG. 5.

FIG. 8 is a diagram of a configuration of an RRM measurement criterion according to embodiments of the disclosure. As shown in FIG. 8, an RRM measurement criterion may be configured as follows.

At S81, a relay UE in a connected state receives information associated with RRM measurement relaxation configured by the network for a remote UE in an unconnected state. The information associated with RRM measurement relaxation may include a not-at-cell-edge criterion. The not-at-cell-edge criterion may include an RSRP threshold, and optionally, may further include an RSRQ threshold.

At S82, the relay UE broadcasts the first not-at-cell-edge criterion. For example, the first not-at-cell-edge criterion is broadcast in Prose Direct Discovery through a PC5-S or PC5-RRC signalling.

The remote UE receives the first not-at-cell-edge criterion broadcast by the relay UE. The remote UE measures channel quality associated with the serving relay UE. The remote UE may perform the following operations when the remote UE determines that a measurement result of an RSRP/RSRP on the serving relay UE meets the first not-at-cell-edge criterion.

First operation, the remote UE may close the RRM measurement on a neighbouring relay UE.

Second operation, the remote UE may initiate a relaxed RRM measurement on a neighbouring relay UE through, for example, increasing a measurement spacing to be M times of a normal measurement spacing, or using a fixed measurement spacing such as one hour, etc.

In another illustrative solution according to embodiments of the disclosure, a network side device may configure a low mobility/stationary criterion to a relay UE in a connected state by broadcasting or a dedicated signalling. The relay UE may configure the low mobility/stationary criterion by broadcasting. A remote UE may initiate a relaxed RRM measurement on a neighbouring relay UE when the remote UE determine that a measurement result of an RSRP/RSRP on the serving relay UE meets the low mobility/stationary criterion.

Figure 9:
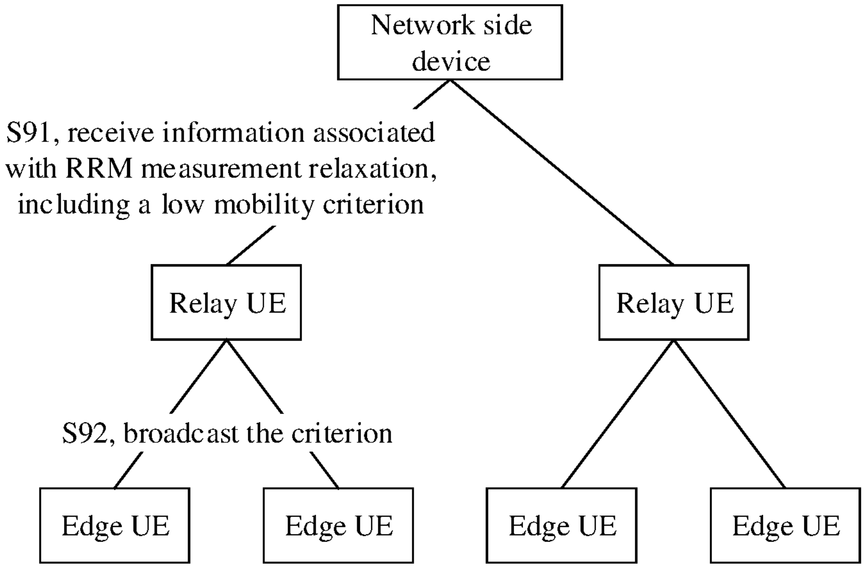
FIG. 9 is a flowchart of a method for processing an RRM measurement according to an exemplary embodiment.

FIG. 9 is a diagram of a configuration of an RRM measurement criterion according to embodiments of the disclosure. As shown in FIG. 9, an RRM measurement criterion may be configured as follows.

At S91, a relay UE in a connected state receives information associated with RRM measurement relaxation configured by a network for a remote UE. The information may include a low mobility/stationary criterion.

The low mobility/stationary criterion may be configured through a dedicated signalling of UE such as an RRC signalling.

At S92, the relay UE broadcasts the low mobility/stationary criterion. For example, the low mobility/stationary criterion is broadcast in Prose Direct Discovery through a PC5-S or PC5-RRC signalling.

The remote UE receives the low mobility/stationary criterion broadcast by the relay UE. The remote UE may measure channel quality associated with the serving relay UE. The remote UE may initiate a relaxed RRM measurement on a neighbouring relay UE through, for example, increasing a measurement spacing to be M times of a normal measurement spacing, or using a fixed measurement spacing such as one hour, etc., when the remote UE determines that a measurement result of an RSRP/RSRP on the serving relay UE meets the low mobility/stationary criterion.

Accordingly, with the solution according to embodiments of the disclosure, a first relay sidelink terminal may indicate a first RRM measurement criterion corresponding to the first relay sidelink terminal, through measurement criterion indication information, to a non-relay sidelink terminal being served by the first relay sidelink terminal. Then, no RRM measurement or a relaxed RRM measurement is performed on another relay sidelink terminal when channel quality measured on the first relay sidelink terminal meets the first RRM measurement criterion. Therefore, power consumption in performing the RRM measurement on another relay sidelink terminal by the non-relay sidelink terminal can be reduced, and endurance capacity of the non-relay sidelink terminal can be improved.

With reference to embodiments shown in FIG. 2 to FIG. 4, in a possible implementation, the first relay sidelink terminal may send transmitting power information of the first relay sidelink terminal to a non-relay sidelink terminal, thereby indicating the first RRM measurement criterion indirectly.

Figure 10:
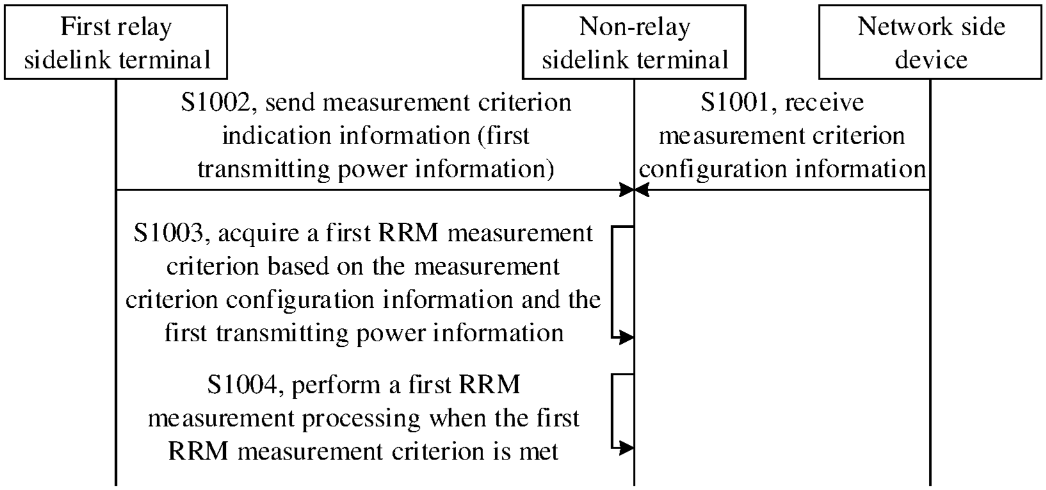
FIG. 10 is a diagram of a configuration of an RRM measurement criterion involved in the embodiment shown in FIG. 9.

FIG. 10 is a flowchart of a method for processing an RRM measurement according to an exemplary embodiment. The method for processing the RRM measurement may be performed by a first relay sidelink terminal and a non-relay sidelink terminal interactively. For example, the first relay sidelink terminal and the non-relay sidelink terminal may be user devices 110 in the implementation environment shown in FIG. 1. As shown in FIG. 10, the method may include the following operations.

At S1001, a non-relay sidelink terminal receives measurement criterion configuration information sent by a network side device.

The non-relay sidelink terminal may acquire a first RRM measurement criterion corresponding to the first relay sidelink terminal based on the measurement criterion configuration information.

In a possible implementation, the first RRM measurement criterion includes at least one of a not-at-cell-edge criterion or a low mobility criterion.

In a possible implementation, the operation that the non-relay sidelink terminal receives the measurement criterion configuration information sent by the network side device may include the following operation.

The non-relay sidelink terminal may receive the measurement criterion configuration information sent by the network side device by means of broadcasting.

Alternatively, the non-relay sidelink terminal may receive the measurement criterion configuration information sent by the network side device through a dedicated signalling.

At S1002, a first relay sidelink terminal sends measurement criterion indication information. The measurement criterion indication information includes first transmitting power information of the first relay sidelink terminal. Accordingly, the non-relay sidelink terminal receives the first transmitting power information.

The first relay sidelink terminal is a relay sidelink terminal serving the non-relay sidelink terminal.

In a possible implementation, the transmitting power information includes a maximum transmitting power or a transmitting power class.

In a possible implementation, the operation that measurement criterion indication information is sent to the non-relay sidelink terminal may include the following operation.

The measurement criterion indication information is sent by means of sidelink broadcasting.

Alternatively, the measurement criterion indication information is sent through a dedicated sidelink signalling.

In a possible implementation, the operation that the first transmitting power information of the first relay sidelink terminal sent by the first relay sidelink terminal is received may include the following operation.

The first transmitting power information sent by the first relay sidelink terminal by means of sidelink broadcasting is received.

Alternatively, the first transmitting power information sent by the first relay sidelink terminal through a dedicated sidelink signalling is received.

At S1003, the non-relay sidelink terminal acquires a first RRM measurement criterion based on the measurement criterion configuration information and the first transmitting power information.

In a possible implementation, when the first RRM measurement criterion includes the not-at-cell-edge criterion, the measurement criterion configuration information includes N RRM measurement criteria and transmitting power information corresponding to the N RRM measurement criteria. N is a positive integer.

The operation that the non-relay sidelink terminal acquires the first RRM measurement criterion based on the measurement criterion configuration information and the first transmitting power information may include the following operation.

The non-relay sidelink terminal may acquire, based on the measurement criterion configuration information, an RRM measurement criterion corresponding to the first transmitting power information as the first RRM measurement criterion.

In a possible implementation, when the first RRM measurement criterion includes the not-at-cell-edge criterion, the measurement criterion configuration information includes a reference RRM measurement criterion and reference transmitting power information.

The operation that the non-relay sidelink terminal acquires the first RRM measurement criterion based on the measurement criterion configuration information and the first transmitting power information may include the following operation.

The non-relay sidelink terminal may acquire the first RRM measurement criterion based on an offset between the first transmitting power information and the reference transmitting power information, and the reference RRM measurement criterion.

In embodiments of the disclosure, the manner that the non-relay sidelink terminal receives the measurement criterion indication information and acquires the first RRM measurement criterion based on the measurement criterion indication information and the first transmitting power information of the first relay sidelink terminal is similar to the manner that the first relay sidelink terminal receives the measurement criterion indication information and acquires the first RRM measurement criterion based on the measurement criterion indication information and the first transmitting power information of the first relay sidelink terminal in the embodiment shown in FIG. 4, which is not elaborated herein again.

At S1004, the non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The second relay sidelink terminal has a serving range covering the non-relay sidelink terminal.

In a possible implementation, the first RRM measurement processing includes stopping the RRM measurement, or performing a relaxed RRM measurement.

In another illustrative solution according to embodiments of the disclosure, the network side device sends at least one not-at-cell-edge criterion for the remote UE by broadcasting or through a dedicated signalling. The at least one not-at-cell-edge criterion corresponds to at least one relay UE power class. Relay UE broadcasts its own transmitting power class. The remote UE may determine a first not-at-cell-edge criterion matching the serving relay UE based on the transmitting power class of the serving relay UE. The remote UE may close the RRM measurement on a neighbouring relay UE or initiate a relaxed RRM measurement on the neighbouring relay UE when the remote UE determines that a measurement result of an RSRP/RSRP on the serving relay UE meets the first not-at-cell-edge criterion.

Figure 11:
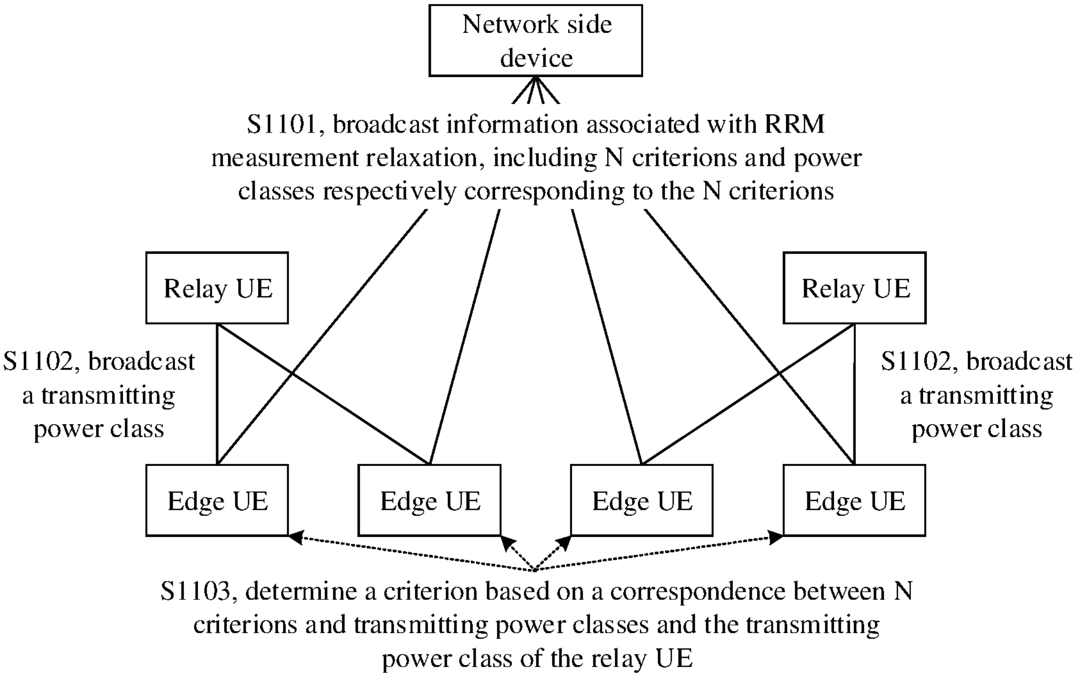
FIG. 11 is a flowchart of a method for processing an RRM measurement according to an exemplary embodiment.

FIG. 11 is a diagram of a configuration of an RRM measurement criterion according to embodiments of the disclosure. As shown in FIG. 11, the RRM measurement criterion may be configured as follows.

At S1101, a remote UE receives information associated with RRM measurement relaxation broadcast by the network. The information associated with RRM measurement relaxation may include at least one not-at-cell-edge criterion, i.e., N criterion(s). Each of the at least one not-at-cell-edge criterion may include an RSRP threshold, and optionally, may further include an RSRQ threshold. Each of the at least one not-at-cell-edge criterion may correspond to at least one UE power class.

At S1102, a relay UE broadcasts its own transmitting power class. For example, the transmitting power class of the relay UE is broadcast in Prose Direct Discovery through a PC5-S or PC5-RRC signalling.

At S1103, the remote UE determines a first not-at-cell-edge criterion corresponding to a serving area range of the relay UE based on at least one not-at-cell-edge criterion broadcast by the network, a correspondence between the at least one not-at-cell-edge criterion and at least one UE power class, and the transmitting power class of the serving relay UE.

The remote UE may measure channel quality associated with the serving relay UE. The remote UE may perform the following operations when the remote UE determines that a measurement result of an RSRP/RSRP on the serving relay UE meets the first not-at-cell-edge criterion.

First operation, the remote UE may close the RRM measurement on a neighbouring relay UE.

Second operation, the remote UE may initiate a relaxed RRM measurement on a neighbouring relay UE through, for example, increasing a measurement spacing to be M times of a normal measurement spacing, or using a fixed measurement spacing such as one hour, etc.

Accordingly, with the solution according to embodiments of the disclosure, a first relay sidelink terminal may indicate a first RRM measurement criterion corresponding to the first relay sidelink terminal, through measurement criterion indication information, to a non-relay sidelink terminal being served by the first relay sidelink terminal. Then, no RRM measurement or a relaxed RRM measurement is performed on another relay sidelink terminal when channel quality measured on the first relay sidelink terminal meets the first RRM measurement criterion. Therefore, power consumption in performing the RRM measurement on another relay sidelink terminal by the non-relay sidelink terminal can be reduced, and endurance capacity of the non-relay sidelink terminal can be improved.

With reference to embodiments shown in FIG. 2 and FIG. 4, in a possible implementation, the network side device may configure the first RRM measurement criterion to the non-relay sidelink terminal directly.

Figure 12:
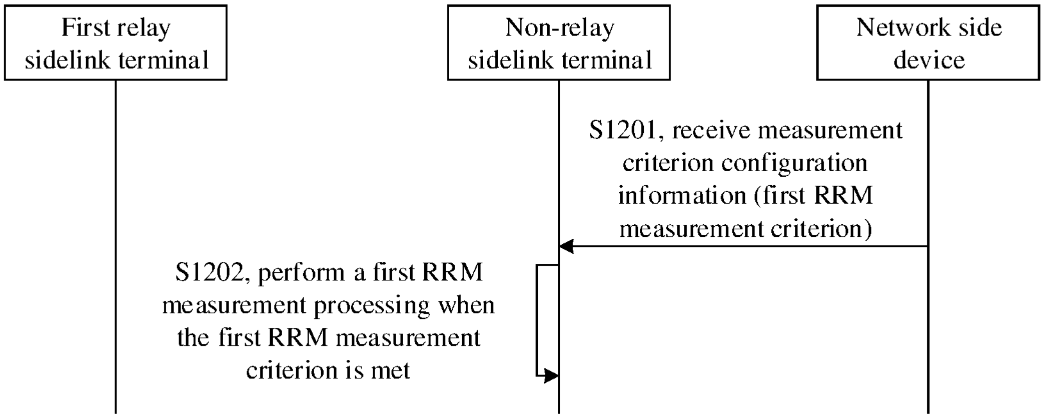
FIG. 12 is a diagram of a configuration of an RRM measurement criterion involved in the embodiment shown in FIG. 11.

FIG. 12 is a flowchart of a method for processing an RRM measurement according to an exemplary embodiment. The method for processing the RRM measurement may be performed by a first relay sidelink terminal and a non-relay sidelink terminal interactively. For example, the first relay sidelink terminal and the non-relay sidelink terminal may be user devices 110 in the implementation environment shown in FIG. 1. As shown in FIG. 11, the method may include the following operations.

At S1201, a non-relay sidelink terminal receives measurement criterion configuration information sent by a network side device. The measurement criterion configuration information indicates a first RRM measurement criterion corresponding to a first relay sidelink terminal.

The non-relay sidelink terminal may acquire the first RRM measurement criterion based on the measurement criterion configuration information.

In a possible implementation, the first RRM measurement criterion includes at least one of a not-at-cell-edge criterion or a low mobility criterion.

In a possible implementation, the operation that the measurement criterion configuration information sent by the network side device is received may include the following operation.

The non-relay sidelink terminal may receive the measurement criterion configuration information sent by the network side device by means of broadcasting.

Alternatively, the non-relay sidelink terminal may receive the measurement criterion configuration information sent by the network side device through a dedicated signalling.

At S1202, the non-relay sidelink terminal performs a first RRM measurement processing on a second relay sidelink terminal other than the first relay sidelink terminal, in relay sidelink terminals, in response to the non-relay sidelink terminal measuring that channel quality associated with the first relay sidelink terminal meets the first RRM measurement criterion. The second relay sidelink terminal has a serving range covering the non-relay sidelink terminal.

In a possible implementation, the first RRM measurement processing includes stopping the RRM measurement, or performing a relaxed RRM measurement.

In another illustrative solution according to embodiments of the disclosure, a network side device may configure a low mobility/stationary criterion to a relay UE in a connected state by broadcasting or a dedicated signalling. The relay UE may configure the low mobility/stationary criterion by broadcasting. A remote UE may initiate a relaxed RRM measurement on a neighbouring relay UE when the remote UE determines that a measurement result of an RSRP/RSRP on the serving relay UE meets the low mobility/stationary criterion.

Accordingly, with the solution according to embodiments of the disclosure, a network side device may indicate a first RRM measurement criterion corresponding to the first relay sidelink terminal, through measurement criterion indication information, to a non-relay sidelink terminal being served by a first relay sidelink terminal. Then, no RRM measurement or a relaxed RRM measurement is performed on another relay sidelink terminal, when channel quality measured on the first relay sidelink terminal meets the first RRM measurement criterion. Therefore, power consumption in performing the RRM measurement on another relay sidelink terminal by the non-relay sidelink terminal can be reduced, and endurance capacity of the non-relay sidelink terminal can be improved.

The solutions shown in FIG. 5, FIG. 10, and FIG. 12 are described respectively with the following examples. The first RRM measurement criterion is configured for the non-relay sidelink terminal by the relay sidelink terminal based on its own transmitting power information; the first RRM measurement criterion is configured for the non-relay sidelink terminal by the relay sidelink terminal and the network side device cooperating with each other based on the transmitting power information of the relay sidelink terminal; and the first RRM measurement criterion is configured for the non-relay sidelink terminal by the network side device separately. The solutions shown in FIG. 5, FIG. 10, and FIG. 12 may be used independently or in a combined form to perform RRM measurement criterion configuration, which is not limited in embodiments of the disclosure.

Apparatus embodiments according to the disclosure set forth hereinafter may be configured to implement the method embodiments according to the disclosure. Details not disclosed in an apparatus embodiment may refer to the method embodiments.

Figure 13:
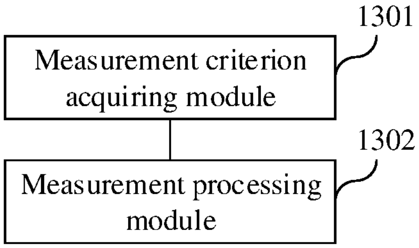
FIG. 13 is a block diagram of an apparatus for processing an RRM measurement according to an exemplary embodiment.

FIG. 13 is a block diagram of an apparatus for processing an RRM measurement according to an exemplary embodiment. The apparatus may perform operations performed by a non-relay sidelink terminal in any embodiment in FIG. 2, FIG. 3, FIG. 4, FIG. 5, FIG. 10, and FIG. 12. The apparatus includes a measurement criterion acquiring module 1301 and a measurement processing module 1302.

The measurement criterion acquiring module is configured to acquire a first RRM measurement criterion corresponding to a first relay sidelink terminal. The first relay sidelink terminal is a relay sidelink terminal serving the non-relay sidelink terminal.

The measurement processing module is configured to perform a first RRM measurement processing on a second relay sidelink terminal, other than the first relay sidelink terminal, in relay sidelink terminals, in response to measuring that channel quality associated with the first relay sidelink terminal meets the first RRM measurement criterion. The second relay sidelink terminal has a serving range covering the non-relay sidelink terminal.

In a possible implementation, the first RRM measurement processing includes stopping the RRM measurement, or performing a relaxed RRM measurement.

In a possible implementation, the first RRM measurement criterion includes at least one of a not-at-cell-edge criterion or a low mobility criterion.

In a possible implementation, the measurement criterion acquiring module 1301 is configured to receive the first RRM measurement criterion sent by the first relay sidelink terminal.

In a possible implementation, the measurement criterion acquiring module 1301 is configured to receive the first RRM measurement criterion sent by the first relay sidelink terminal by means of sidelink broadcasting.

Alternatively, the measurement criterion acquiring module is configured to receive the first RRM measurement criterion sent by the first relay sidelink terminal through a dedicated sidelink signalling.

In a possible implementation, the apparatus further includes a configuration information receiving module.

The configuration information receiving module is configured to receive measurement criterion configuration information sent by a network side device.

The measurement criterion acquiring module 1301 is configured to acquire the first RRM measurement criterion based on the measurement criterion configuration information.

In a possible implementation, when the first RRM measurement criterion includes the not-at-cell-edge criterion, the measurement criterion configuration information includes N RRM measurement criteria and transmitting power information corresponding to the N RRM measurement criteria. N is a positive integer.

The measurement criterion acquiring module 1301 is configured to receive first transmitting power information of the first relay sidelink terminal sent by the first relay sidelink terminal; and acquire, based on the measurement criterion configuration information, an RRM measurement criterion corresponding to the first transmitting power information as the first RRM measurement criterion.

In a possible implementation, when the first RRM measurement criterion includes the not-at-cell-edge criterion, the measurement criterion configuration information includes a reference RRM measurement criterion and reference transmitting power information.

The measurement criterion acquiring module 1301 is configured to receive first transmitting power information of the first relay sidelink terminal sent by the first relay sidelink terminal; and acquire the first RRM measurement criterion based on an offset between the first transmitting power information and the reference transmitting power information, and the reference RRM measurement criterion.

In a possible implementation, the transmitting power information includes a maximum transmitting power or a transmitting power class.

In a possible implementation, the measurement criterion acquiring module 1301 is configured to receive the first transmitting power information sent by the first relay sidelink terminal by means of sidelink broadcasting.

Alternatively, the measurement criterion acquiring module may be configured to receive the first transmitting power information sent by the first relay sidelink terminal through a dedicated sidelink signalling.

In a possible implementation, the measurement criterion configuration information indicates the first RRM measurement criterion.

In a possible implementation, the configuration information receiving module is configured to receive the measurement criterion configuration information sent by the network side device by means of broadcasting.

Alternatively, the configuration information receiving module is configured to receive the measurement criterion configuration information sent by the network side device through a dedicated signalling.

Accordingly, with the solution according to embodiments of the disclosure, a non-relay sidelink terminal being served by a first relay sidelink terminal acquires a first RRM measurement criterion corresponding to the first relay sidelink terminal. Then, the non-relay sidelink terminal may perform no RRM measurement processing or a relaxed RRM measurement on another relay sidelink terminal when channel quality measured on the first relay sidelink terminal meets the first RRM measurement criterion. Therefore, power consumption in performing the RRM measurement on another relay sidelink terminal by the non-relay sidelink terminal can be reduced, and endurance capacity of the non-relay sidelink terminal can be improved.

Figure 14:
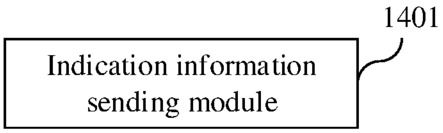
FIG. 14 is a block diagram of an apparatus for processing an RRM measurement according to an exemplary embodiment.

FIG. 14 is a block diagram of an apparatus for processing an RRM measurement according to an exemplary embodiment. The apparatus may perform operations performed by a first relay sidelink terminal in any embodiment in FIG. 2, FIG. 3, FIG. 4, FIG. 5, FIG. 10, and FIG. 12. The apparatus may include an indication information sending module 1401.

The indication information sending module is configured to send measurement criterion indication information to a non-relay sidelink terminal. The first relay sidelink terminal is a relay sidelink terminal serving the non-relay sidelink terminal. The measurement criterion indication information is used for instructing the non-relay sidelink terminal to acquire a first RRM measurement criterion corresponding to the first relay sidelink terminal, such that the non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The second relay sidelink terminal has a serving range covering the non-relay sidelink terminal.

In a possible implementation, the first RRM measurement processing includes stopping the RRM measurement, or performing a relaxed RRM measurement.

In a possible implementation, the first RRM measurement criterion includes at least one of a not-at-cell-edge criterion or a low mobility criterion.

In a possible implementation, the measurement criterion indication information includes the first RRM measurement criterion.

In a possible implementation, the apparatus further includes a configuration information receiving module and a measurement criterion acquiring module.

The configuration information receiving module is configured to receive measurement criterion configuration information sent by a network side device.

The measurement criterion acquiring module is configured to acquire the first RRM measurement criterion based on the measurement criterion configuration information.

In a possible implementation, when the first RRM measurement criterion includes the not-at-cell-edge criterion, the measurement criterion configuration information includes N RRM measurement criteria and transmitting power information corresponding to the N RRM measurement criteria. N is a positive integer.

The measurement criterion acquiring module is configured to acquire, based on the measurement criterion configuration information, an RRM measurement criterion corresponding to first transmitting power information of the first relay sidelink terminal as the first RRM measurement criterion.

In a possible implementation, when the first RRM measurement criterion includes the not-at-cell-edge criterion, the measurement criterion configuration information includes a reference RRM measurement criterion and reference transmitting power information.

The measurement criterion acquiring module is configured to acquire the first RRM measurement criterion based on an offset between first transmitting power information of the first relay sidelink terminal and the reference transmitting power information, and the reference RRM measurement criterion.

In a possible implementation, the measurement criterion indication information includes first transmitting power information of the first relay sidelink terminal.

In a possible implementation, the transmitting power information includes a maximum transmitting power or a transmitting power class.

In a possible implementation, the measurement criterion configuration information indicates the first RRM measurement criterion.

In a possible implementation, the configuration information receiving module is configured to receive the measurement criterion configuration information sent by the network side device by means of broadcasting.

Alternatively, the configuration information receiving module is configured to receive the measurement criterion configuration information sent by the network side device through a dedicated signalling.

In a possible implementation, the indication information sending module 1401 is configured to send the measurement criterion indication information by means of sidelink broadcasting.

Alternatively, the indication information sending module is configured to send the measurement criterion indication information through a dedicated signalling.

Accordingly, with the solution according to embodiments of the disclosure, a first relay sidelink terminal may indicate a first RRM measurement criterion corresponding to the first relay sidelink terminal, through measurement criterion indication information, to a non-relay sidelink terminal being served by the first relay sidelink terminal. Then, the non-relay sidelink terminal may perform no RRM measurement processing or a relaxed RRM measurement on another relay sidelink terminal when channel quality measured on the first relay sidelink terminal meets the first RRM measurement criterion. Therefore, power consumption in performing the RRM measurement on another relay sidelink terminal by the non-relay sidelink terminal can be reduced, and endurance capacity of the non-relay sidelink terminal can be improved.

Figure 15:
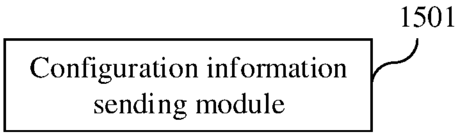
FIG. 15 is a block diagram of an apparatus for processing an RRM measurement according to an exemplary embodiment.

FIG. 15 is a block diagram of an apparatus for processing an RRM measurement according to an exemplary embodiment. The apparatus may perform operations performed by a network side device in any embodiment in FIG. 4, FIG. 5, FIG. 10, and FIG. 12. The apparatus includes a configuration information sending module 1501.

The configuration information sending module is configured to send measurement criterion configuration information to a sidelink terminal. The measurement criterion configuration information is used for instructing the sidelink terminal to acquire a first RRM measurement criterion corresponding to a first relay sidelink terminal, such that a non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The first relay sidelink terminal is a relay sidelink terminal serving the non-relay sidelink terminal, and the second relay sidelink terminal has a serving range covering the non-relay sidelink terminal.

In a possible implementation, the first RRM measurement processing includes stopping the RRM measurement, or performing a relaxed RRM measurement.

In a possible implementation, the sidelink terminal is at least one of the first relay sidelink terminal or the non-relay sidelink terminal.

In a possible implementation, the first RRM measurement criterion includes at least one of a not-at-cell-edge criterion or a low mobility criterion.

In a possible implementation, when the first RRM measurement criterion includes the not-at-cell-edge criterion, the measurement criterion configuration information includes N RRM measurement criteria and transmitting power information corresponding to the N RRM measurement criteria. N is a positive integer.

Alternatively, when the first RRM measurement criterion includes the not-at-cell-edge criterion, the measurement criterion configuration information includes a reference RRM measurement criterion and reference transmitting power information.

Alternatively, the measurement criterion configuration information indicates the first RRM measurement criterion.

In a possible implementation, the transmitting power information includes a maximum transmitting power or a transmitting power class.

In a possible implementation, the configuration information sending module 1501 is configured to send the measurement criterion configuration information to the sidelink terminal by means of broadcasting.

Alternatively, the configuration information sending module is configured to send the measurement criterion configuration information to the sidelink terminal through a dedicated signalling.

Accordingly, with the solution according to embodiments of the disclosure, a network side device may initiate, through measurement criterion configuration information, a process of configuring, for a non-relay sidelink terminal being served by a first relay sidelink terminal, a first RRM measurement criterion corresponding to the first relay sidelink terminal. Then, the non-relay sidelink terminal may perform no RRM measurement processing or a relaxed RRM measurement on another relay sidelink terminal when channel quality measured on the first relay sidelink terminal meets the first RRM measurement criterion. Therefore, power consumption in performing the RRM measurement on another relay sidelink terminal by the non-relay sidelink terminal can be reduced, and endurance capacity of the non-relay sidelink terminal can be improved.

It is noted that division of the functional modules is merely illustrative in implementing the function by the apparatus according to the embodiment. In application, the function may be allocated to different functional modules as needed. That is, a content structure of the device may be divided into different functional modules for carrying out all or part of the above functions.

A way a module of the apparatus executing operations is described in the illustrative methods in detail, which is not elaborated herein again.

Figure 16:
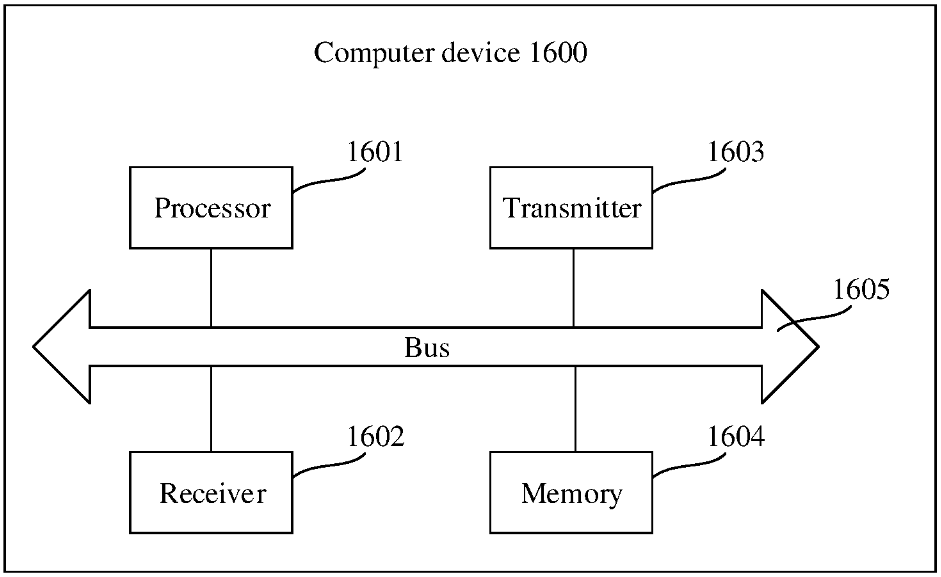
FIG. 16 is a diagram of a structure of a computer device according to an embodiment of the disclosure.

FIG. 16 is a diagram of a structure of a computer device 1600 according to an embodiment of the disclosure. The computer device 1600 includes a processor 1601, a receiver 1602, a transmitter 1603, a memory 1604, and a bus 1605.

The processor 1601 may include one or more processing cores. The processor 1601 may implement various functional applications and information processing by executing software programs and modules.

The receiver 1602 and the transmitter 1603 may be implemented as one communication component. The communication component may be a communication chip. The communication chip may also be referred to as a transceiver.

The memory 1604 is connected to the processor 1601 via the bus 1605.

The memory 1604 may be configured to store a computer program. The processor 1601 may be configured to execute the computer program to implement the steps performed by a network side device or a terminal in a wireless communication system in the foregoing method embodiment.

Further, the memory 1604 may be implemented by any type of volatile or non-volatile storage equipment, or a combination of the volatile or non-volatile storage equipment. The volatile or non-volatile memory includes, but is not limited to, a magnetic disk or an optical disk, an electrically erasable programmable read-only memory (EEPROM), an erasable programmable read-only memory (EPROM), a static random access memory (SRAM), a read only memory (ROM), a magnetic memory, a flash memory, a programmable ROM (PROM), etc.

In an exemplary embodiment, the computer device includes a processor, a memory, and a transceiver. The transceiver may include a receiver and a transmitter, the receiver is configured to receive information and the transmitter is configured to send information.

In a possible implementation, when the computer device is implemented as a user device in the system shown in FIG. 1, the processor is configured to acquire a first RRM measurement criterion corresponding to a first relay sidelink terminal. The first relay sidelink terminal is a relay sidelink terminal serving the non-relay sidelink terminal.

The processor is further configured to perform a first RRM measurement processing on a second relay sidelink terminal, other than the first relay sidelink terminal, in relay sidelink terminals, in response to measuring that channel quality associated with the first relay sidelink terminal meets the first RRM measurement criterion. The second relay sidelink terminal has a serving range covering the non-relay sidelink terminal.

In this case, the computer device may be configured to perform all or some of the steps performed by the non-relay sidelink terminal in the foregoing solution according to any embodiment shown in FIG. 2, FIG. 3, FIG. 4, FIG. 5, FIG. 10, and FIG. 12.

In a possible implementation, when the computer device is implemented as a user device in the system shown in FIG. 1, the transceiver is configured to send measurement criterion indication information to a non-relay sidelink terminal. The first relay sidelink terminal is a relay sidelink terminal serving the non-relay sidelink terminal. The measurement criterion indication information is used for instructing the non-relay sidelink terminal to acquire a first RRM measurement criterion corresponding to the first relay sidelink terminal, such that the non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The second relay sidelink terminal has a serving range covering the non-relay sidelink terminal.

In this case, the computer device may be configured to perform all or some of the steps performed by the first relay sidelink terminal in the foregoing solution according to any embodiment shown in FIG. 2, FIG. 3, FIG. 4, FIG. 5, FIG. 10, and FIG. 12.

In a possible implementation, when the computer device is implemented as a base station or a network managing device in the system shown in FIG. 1, the transceiver is configured to send measurement criterion configuration information to a sidelink terminal. The measurement criterion configuration information is used for instructing the sidelink terminal to acquire a first RRM measurement criterion corresponding to a first relay sidelink terminal, such that a non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion. The first relay sidelink terminal is a relay sidelink terminal serving the non-relay sidelink terminal. The second relay sidelink terminal has a serving range covering the non-relay sidelink terminal.

In this case, the computer device may be configured to perform all or some of the steps performed by the network side device in the foregoing solution according to any embodiment shown in FIG. 4, FIG. 5, FIG. 10, and FIG. 12.

Embodiments of the disclosure further provide a computer-readable storage medium having stored thereon a computer program which, when being loaded and executed by a processor, causes the processor to perform the steps of the foregoing method shown in FIG. 2, FIG. 3, FIG. 4, FIG. 5, FIG. 10, and FIG. 12 performed by the non-relay sidelink terminal, the first relay sidelink terminal, or the network side device.

Embodiments of the disclosure further provide a computer program product, including computer instructions stored in a computer-readable storage medium. The computer instructions, when being read from the computer-readable storage medium and executed by a processor of a computer device, cause the computer device to perform the steps of the foregoing method shown in FIG. 2, FIG. 3, FIG. 4, FIG. 5, FIG. 10, and FIG. 12 performed by the non-relay sidelink terminal, the first relay sidelink terminal, or the network side device.

Embodiments of the disclosure further provide a chip configured to be operated in a computer device, to enable the computer device to perform the steps of the foregoing method shown in FIG. 2, FIG. 3, FIG. 4, FIG. 5, FIG. 10, and FIG. 12 performed by the non-relay sidelink terminal, the first relay sidelink terminal, or the network side device.

Embodiments of the disclosure further provide a computer program, when being executed by a processor of a computer device, causes the processor to perform the steps of the foregoing method shown in FIG. 2, FIG. 3, FIG. 4, FIG. 5, FIG. 10, and FIG. 12 performed by the non-relay sidelink terminal, the first relay sidelink terminal, or the network side device.

A person having ordinary skill in the art may realize that functions illustrated in embodiments of the disclosure may be implemented by hardware, software, firmware, or any combination of the hardware, the software and the firmware in the one or more examples herein. When being implemented by software, such functions may be stored in a computer-readable medium, or transmitted as one or more instructions or codes in the computer-readable medium. The computer-readable medium may include a computer storage medium, a communication medium, etc. The communication medium may include any medium that facilitates transmitting a computer program from one place to another. The storage medium may be any available medium accessible by a universal or special-purpose computer.

The technical solution provided by embodiments of the disclosure may include following beneficial effects.

A non-relay sidelink terminal served by a first relay sidelink terminal acquires a first RRM measurement criterion corresponding to the first relay sidelink terminal. Then, the non-relay sidelink terminal performs the corresponding first RRM measurement processing when channel quality acquired by performing measurement on the first relay sidelink terminal meets the first RRM measurement criterion. That is, the RRM measurement processing performed by the non-relay sidelink terminal is controlled by the RRM measurement criterion, thereby improving flexibility of the RRM measurement, balancing performance of the RRM measurement and power consumption of the terminal. Therefore, power consumption in RRM measurement on another relay sidelink terminal by the non-relay sidelink terminal can be reduced, and endurance capacity of the non-relay sidelink terminal can be improved.

What described is merely embodiments of the disclosure, and is not intended to limit the disclosure. Any modification, equivalent replacement, improvement, and/or the like made within the spirit and principle of the disclosure should be included in the scope of the disclosure.

The invention claimed is:

1. A method for processing a radio resource management (RRM) measurement, performed by a non-relay sidelink terminal, the method comprising:

receiving measurement criterion configuration information sent by a network device;

acquiring a first RRM measurement criterion corresponding to a first relay sidelink terminal, the first relay sidelink terminal being a relay sidelink terminal serving the non-relay sidelink terminal; and in response to measuring that channel quality associated with the first relay sidelink terminal meets the first RRM measurement criterion, performing a first RRM measurement processing on a second relay sidelink terminal, other than the first relay sidelink terminal, in relay sidelink terminals, the second relay sidelink terminal having a serving range covering the non-relay sidelink terminal, wherein acquiring the first RRM measurement criterion corresponding to the first relay sidelink terminal comprises: acquiring the first RRM measurement criterion based on the measurement criterion configuration information, wherein in response to the first RRM measurement criterion comprising a not-at-cell-edge criterion, the measurement criterion configuration information comprises N RRM measurement criteria and transmitting power information corresponding to the N RRM measurement criteria, N being a positive integer greater than 1, each of the N RRM measurement criteria comprising a reference signal receiving power (RSRP) threshold or a reference signal receiving quality (RSRQ) threshold, and acquiring the first RRM measurement criterion based on the measurement criterion configuration information comprises: receiving first transmitting power information of the first relay sidelink terminal sent by the first relay sidelink terminal; and acquiring, based on the measurement criterion configuration information, an RRM measurement criterion corresponding to the first transmitting power information as the first RRM measurement criterion;

or, wherein in response to the first RRM measurement criterion comprising a not-at-cell-edge criterion, the measurement criterion configuration information comprises a reference RRM measurement criterion and reference transmitting power information, the reference RRM measurement criterion comprising an RSRP threshold or an RSRQ threshold, and acquiring the first RRM measurement criterion based on the measurement criterion configuration information comprises: receiving first transmitting power information of the first relay sidelink terminal sent by the first relay sidelink terminal; and acquiring the first RRM measurement criterion based on an offset between the first transmitting power information and the reference transmitting power information, and the reference RRM measurement criterion.

2. The method of claim 1, wherein the first RRM measurement processing comprises stopping the RRM measurement or performing a relaxed RRM measurement.

3. The method of claim 1, wherein the transmitting power information comprises a maximum transmitting power or a transmitting power class.

4. The method of claim 1, wherein receiving the first transmitting power information of the first relay sidelink terminal sent by the first relay sidelink terminal comprises:

receiving the first transmitting power information sent by the first relay sidelink terminal by means of sidelink broadcasting; or receiving the first transmitting power information sent by the first relay sidelink terminal through a dedicated sidelink signalling.

5. The method of claim 1, wherein receiving the measurement criterion configuration information sent by the network device comprises:

receiving the measurement criterion configuration information sent by the network side device by means of broadcasting; or receiving the measurement criterion configuration information sent by the network side device through a dedicated signalling.

6. A non-relay sidelink terminal, comprising a processor, a memory, and a transceiver, wherein the processor is configured to cooperate with the transceiver to perform the method of claim 1.

7. A method for processing a radio resource management (RRM) measurement, performed by a first relay sidelink terminal, the method comprising:

receiving measurement criterion configuration information sent by a network side device;

acquiring a first RRM measurement criterion based on the measurement criterion configuration information; and sending measurement criterion indication information to a non-relay sidelink terminal, the first relay sidelink terminal being a relay sidelink terminal serving the non-relay sidelink terminal, wherein the measurement criterion indication information is used for instructing the non-relay sidelink terminal to acquire the first RRM measurement criterion corresponding to the first relay sidelink terminal, such that the non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion, and wherein the second relay sidelink terminal has a serving range covering the non-relay sidelink terminal, wherein in response to the first RRM measurement criterion comprising a not-at-cell-edge criterion, the measurement criterion configuration information comprises N RRM measurement criteria and transmitting power information corresponding to the N RRM measurement criteria, N being a positive integer greater than 1, each of the N RRM measurement criteria comprising a reference signal receiving power (RSRP) threshold or a reference signal receiving quality (RSRQ) threshold, and acquiring the first RRM measurement criterion based on the measurement criterion configuration information comprises: acquiring, based on the measurement criterion configuration information, an RRM measurement criterion corresponding to first transmitting power information of the first relay sidelink terminal as the first RRM measurement criterion;

or, wherein in response to the first RRM measurement criterion comprising a not-at-cell-edge criterion, the measurement criterion configuration information comprises a reference RRM measurement criterion and reference transmitting power information, the reference RRM measurement criterion comprising an RSRP threshold or an RSRQ threshold, and acquiring the first RRM measurement criterion based on the measurement criterion configuration information comprises: acquiring the first RRM measurement criterion based on an offset between first transmitting power information of the first relay sidelink terminal and the reference transmitting power information, and the reference RRM measurement criterion.

8. The method of claim 7, wherein at least one of the following applies:

the first RRM measurement processing comprises stopping the RRM measurement, or performing a relaxed RRM measurement; or the first RRM measurement criterion further comprises a low mobility criterion.

9. The method of claim 8, wherein receiving the measurement criterion configuration information sent by the network side device comprises:

receiving the measurement criterion configuration information sent by the network side device by means of broadcasting; or receiving the measurement criterion configuration information sent by the network side device through a dedicated signalling.

10. The method of claim 7, wherein the transmitting power information comprises a maximum transmitting power or a transmitting power class.

11. A first relay sidelink terminal, comprising a processor, a memory, and a transceiver, wherein the transceiver is controlled by the processor to perform the method of claim 7.

12. A network side device, comprising a processor, a memory, and a transceiver, wherein the transceiver is controlled by the processor to send measurement criterion configuration information to a sidelink terminal, the measurement criterion configuration information is used for instructing the sidelink terminal to acquire a first RRM measurement criterion corresponding to a first relay sidelink terminal, such that a non-relay sidelink terminal performs a first RRM measurement processing on a second relay sidelink terminal, other than the first relay sidelink terminal, in relay sidelink terminals, in response to the non-relay sidelink terminal measuring that channel quality associated with the first relay sidelink terminal meets the first RRM measurement criterion, the first relay sidelink terminal is a relay sidelink terminal serving the non-relay sidelink terminal, and wherein the second relay sidelink terminal has a serving range covering the non-relay sidelink terminal, wherein in response to the first RRM measurement criterion comprising a not-at-cell-edge criterion, the measurement criterion configuration information comprises N RRM measurement criteria and transmitting power information corresponding to the N RRM measurement criteria, N being a positive integer greater than 1, each of the N RRM measurement criteria comprising a reference signal receiving power (RSRP) threshold or a reference signal receiving quality (RSRQ) threshold, and the measurement criterion configuration information is used for instructing the sidelink terminal to acquire an RRM measurement criterion corresponding to first transmitting power information of the first relay sidelink terminal as the first RRM measurement criterion;

or, wherein in response to the first RRM measurement criterion comprising a not-at-cell-edge criterion, the measurement criterion configuration information comprises a reference RRM measurement criterion and reference transmitting power information, the reference RRM measurement criterion comprising an RSRP threshold or an RSRQ threshold, and the measurement criterion configuration information is used for instructing the sidelink terminal to acquire the first RRM measurement criterion based on an offset between first transmitting power information of the first relay sidelink terminal and the reference transmitting power information, and the reference RRM measurement criterion.

13. The network side device of claim 12, wherein the first RRM measurement processing comprises stopping the RRM measurement, or performing a relaxed RRM measurement.

14. The network side device of claim 12, wherein the first RRM measurement criterion further comprises a low mobility criterion.

* * * * *